(12) United States Patent
Uotani

(10) Patent No.: US 8,368,945 B2
(45) Date of Patent: Feb. 5, 2013

(54) PRIORITY BASED PRINTER SETTING

(75) Inventor: Kenichiro Uotani, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1180 days.

(21) Appl. No.: 11/857,200

(22) Filed: Sep. 18, 2007

(65) Prior Publication Data

US 2008/0158582 A1      Jul. 3, 2008

(30) Foreign Application Priority Data

Dec. 27, 2006   (JP) .................................. 2006-352760

(51) Int. Cl.
  *G06F 3/12*     (2006.01)
  *G06K 15/00*   (2006.01)
(52) U.S. Cl. ...................................... 358/1.18; 358/1.13
(58) Field of Classification Search .......................... None
  See application file for complete search history.

(56) References Cited

U.S. PATENT DOCUMENTS

| | | | | |
|---|---|---|---|---|
| 5,129,639 | A | * | 7/1992 | DeHority ..................... 270/1.01 |
| 6,809,831 | B1 | | 10/2004 | Minari |
| 2003/0182475 | A1 | * | 9/2003 | Gimenez ........................... 710/8 |
| 2004/0088654 | A1 | | 5/2004 | Uotani |
| 2005/0094200 | A1 | * | 5/2005 | Uekusa et al. ............... 358/1.15 |
| 2005/0105146 | A1 | * | 5/2005 | Tanaka .......................... 358/498 |
| 2005/0286100 | A1 | | 12/2005 | Uotani et al. |
| 2006/0028667 | A1 | | 2/2006 | Saito ............................ 358/1.13 |
| 2006/0106775 | A1 | * | 5/2006 | Kuhn et al. ....................... 707/3 |
| 2006/0139674 | A1 | * | 6/2006 | Oshima ........................ 358/1.13 |
| 2008/0291497 | A1 | * | 11/2008 | Kuwano et al. ............. 358/1.18 |

FOREIGN PATENT DOCUMENTS

| | | |
|---|---|---|
| JP | 2000035867 | 2/2000 |
| JP | 2006-48537 | 2/2006 |

\* cited by examiner

*Primary Examiner* — Twyler Haskins
*Assistant Examiner* — Barbara Reinier
(74) *Attorney, Agent, or Firm* — Fitzpatrick, Cella, Harper & Scinto

(57) ABSTRACT

An information processing apparatus for outputting a document to a printer. Whether or not each of a plurality of set values set for one printing condition is a set value by which a print output can be performed in the printer is discriminated. If a plurality of set values determined to be the set values by the print output can be performed in the printer exists among the plurality of set values, by deciding the set value of the printing condition according to a priority added to each of the plurality of set values, a proper print result is provided according to the printing conditions set on a distributing source side of print content.

15 Claims, 21 Drawing Sheets

```
<psf:Feature name="MediaType">
   <psf:Option name="ProPhoto" priority=1/>
   <psf:Option name="SuperPhoto" priority=2/>
   <psf:Option name="Glossy" priority=3/>
   <psf:Option name="OtherPhoto" priority=4/>
</psf:Feature>
```

600

| PRIORITY | NAME OF SET VALUE |
|---|---|
| 1 | ProPhoto |
| 2 | SuperPhoto |
| 3 | Glossy |
| 4 | OtherPhoto |

700

| MEDIA TYPE | NAME OF SET VALUE | DEFAULT PAPER |
|---|---|---|
| PLAIN PAPER | Plain | YES |
| PROFESSIONAL PHOTO PAPER | ProPhoto | NO |
| SUPER PHOTO PAPER | SuperPhoto | NO |
| GLOSSY PAPER | Glossy | NO |
| POSTCARD | Postcard | NO |
| ENVELOPE | Envelope | NO |
| OHP FILM | Transparency | NO |
| OTHER PHOTO PAPER | OtherPhoto | NO |

800

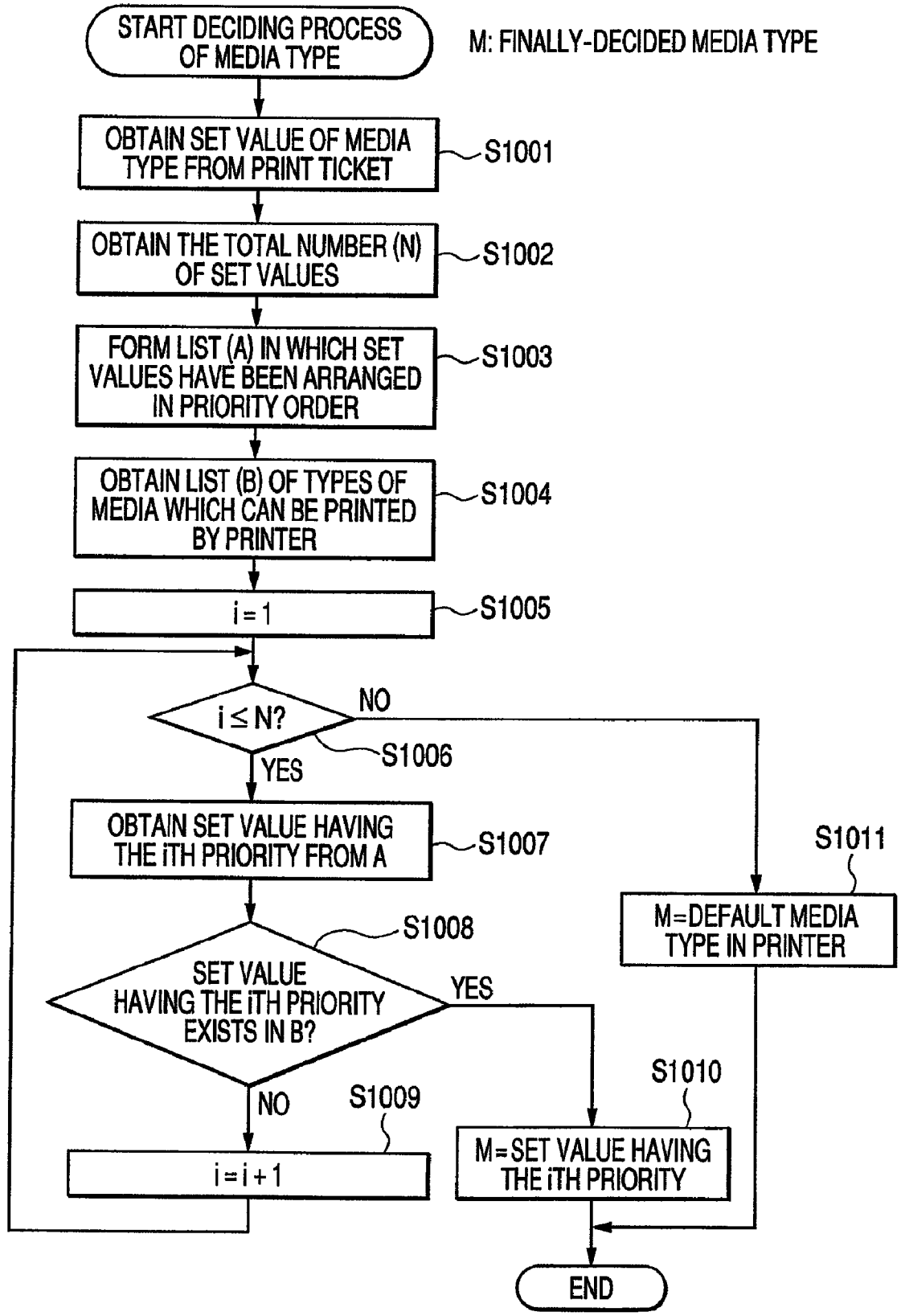

FIG. 11

| TYPE OF OUTPUTTING APPARATUS | SUPPORTING MEDIA TYPE | FINALLY-DECIDED MEDIA TYPE |
|---|---|---|
| A | PLAIN, GLOSSY, POSTCARD, ENVELOPE, TRANSPARENCY | GLOSSY |
| B | PLAIN, OTHER PHOTO, HIGH RESOLUTION PAPER | OTHER PHOTO |
| C | PLAIN, PROPHOTO, SUPERPHOTO, GLOSSY, POSTCARD, ENVELOPE, TRANSPARENCY, OTHER PHOTO | PROPHOTO |
| D | PLAIN, SUPERPHOTO, ENVELOPE, TRANSPARENCY, OTHER PHOTO | SUPERPHOTO |

```
<psf:Feature name="MediaType">
    <psf:Option name="ProPhoto" priority=1/>
</psf:Feature>
```

```
<psf:Feature name="PaperSize">
   <psf:Option name="PanoramaPhoto" priority=1/>
   <psf:Option name="LPhoto" priority=2>
      <psf:Property name="AdjustLayout">
         <psf:Value xsi:type="xsd:QName">Centering</psf:Value>
      </psf:Property>
   </psf:Option>
</psf:Feature>
```

| LAYOUT ADJUSTING METHOD | CONTENTS OF LAYOUT CORRECTING PROCESS |
|---|---|
| NONE | LAYOUT ADJUSTMENT IS NOT MADE |
| CENTERING | ARRANGE CENTER POSITION OF DOCUMENT TO CENTER POSITION OF OUTPUT SHEET |
| TOPLEFT | ARRANGE DOCUMENT BY MATCHING THE TOP LEFT WITH THE TOP LEFT OF OUTPUT SHEET |
| ⋮ | ⋮ |
| WHOLE | ARRANGE DOCUMENT SO THAT THE WHOLE DOCUMENT IS ENCLOSED IN (INSCRIBED WITH) OUTPUT SHEET |

2100

| PRIORITY | NAME OF SET VALUE | LAYOUT ADJUSTING METHOD |
|---|---|---|
| 1 | PanoramaPhoto | NONE |
| 2 | LPhoto | CENTERING |

1400

| SHEET | NAME OF SET VALUE | WIDTH (mm) | LENGTH (mm) | DEFAULT PAPER |
|---|---|---|---|---|
| LETTER | Letter | 215.9 | 279.4 | NO |
| A4 | A4 | 210 | 297 | YES |
| B5 | B5 | 182 | 257 | NO |
| POSTCARD | Postcard | 100 | 148 | NO |
| L SIZE | LPhoto | 89 | 127 | NO |
| CUSTOM PAPER | CustomSize | — | — | NO |

STORING MEDIUM
SUCH AS FD/CD-ROM, ETC.

| DIRECTORY INFORMATION |
|---|
| THE 1ST DATA PROCESSING PROGRAM PROGRAM CODE GROUP CORRESPONDING TO STEPS IN FLOWCHART SHOWN IN FIG. 9 |
| THE 2ND DATA PROCESSING PROGRAM PROGRAM CODE GROUP CORRESPONDING TO STEPS IN FLOWCHART SHOWN IN FIG. 10 |
| THE 3RD DATA PROCESSING PROGRAM PROGRAM CODE GROUP CORRESPONDING TO STEPS IN FLOWCHART SHOWN IN FIG. 16 |
| THE 4TH DATA PROCESSING PROGRAM PROGRAM CODE GROUP CORRESPONDING TO STEPS IN FLOWCHART SHOWN IN FIG. 17 |
| THE 5TH DATA PROCESSING PROGRAM PROGRAM CODE GROUP CORRESPONDING TO STEPS IN FLOWCHART SHOWN IN FIG. 18 |
| THE 6TH DATA PROCESSING PROGRAM PROGRAM CODE GROUP CORRESPONDING TO STEPS IN FLOWCHART SHOWN IN FIG. 25 |
| THE 7TH DATA PROCESSING PROGRAM PROGRAM CODE GROUP CORRESPONDING TO STEPS IN FLOWCHART SHOWN IN FIG. 26 |
| × |

MEMORY MAP IN STORING MEDIUM

PRIORITY BASED PRINTER SETTING

BACKGROUND OF THE INVENTION

1. Field of the Invention

The present invention relates to an information processing apparatus and a print setting method.

2. Description of the Related Art

In recent years, in association with the spread of digital cameras, it is a general case that photograph images (hereinbelow, also simply referred to as photo images) obtained by photographing objects by the user are stored as electronic data and distributed to his family and acquaintances through the Internet or a memory card.

In addition to it, in association with the realization of high picture quality of a printing apparatus (hereinbelow, also simply referred to as a printer), it is a general case that the photo images obtained by photographing the objects by the user by using the digital camera or obtained by being provided from another person are output by the printer in his own house.

When the photo images are output by the printer, it is a general case that in an information processing apparatus such as a personal computer, the photo images are output to dedicated paper for photo printing (hereinbelow, called "photo paper") by using an application for outputting the photo images.

Upon outputting, in the application in the information processing apparatus, as printing conditions to the printer, it is necessary for the user to set a size, a type, and the like of sheets (photo paper) which have been set in the printer so as to output. The "size" is hereinbelow called an "output sheet" and the "type" is hereinbelow called a "media type".

When a print executing command is received from the user, the application executes an issuing process of a print command according to an OS (Operating System) in which the application is working and a print system which is provided by the OS.

For example, the application is working on the OS such as "Windows (registered trademark) XP", "Windows (registered trademark) 2000", or the like issues the print command according to a format of the print system called a GDI print path which is provided by the OS. The "GDI" is an abbreviation of Graphics Device Interface.

In the print command issuing process according to the GDI print path, after a print control apparatus was notified of the printing conditions, drawing area information according to the printer which prints and outputs and the sheet is obtained. Subsequently, a draw command is issued by using the obtained drawing area information and a document such as a photo image or the like and the print control apparatus is notified of the draw command.

In "Windows (registered trademark) Vista", in addition to the above-described GDI print path, a print system called an XPS (XML Paper Specification) print path is newly provided.

In a print command issuing process according to the XPS print path, the document such as a photo image or the like, the printing conditions, and the draw command are formed as one document file (hereinbelow, called an "XPS document") and the print control apparatus is notified of the XPS document.

In the print control apparatus, when the print command is issued by the application, prior to executing an image process, whether or not the notified printing conditions are settings suitable for the printer is discriminated.

The following control method has generally been known. That is, if the output sheets and media types supported by the printer have already been set, the image process according to the output sheet and media type which have been set as printing conditions is executed. If the output sheet and media type which are not supported by the printer have been set, the set output sheet and media type are determined to be invalid, they are replaced with the predetermined regular output sheet and media type, and the image process is executed.

There has also been known a method of controlling in such a manner that if a substitutive printer exists, the printer which supports the set output sheet and media type is searched for and the photo images are printed and output from such a printer (for example, refer to Japanese Patent Application Laid-Open No. 2000-035867).

There is such a service that the document such as a photo image or the like is provided and distributed to an unspecified large number of users by using Web, E-mail, or the like and downloaded to the PC of the user himself and the printing is executed. In such a service, it is a general method that after the document was downloaded, the user himself sets printing conditions (sheet type, print quality) adapted to the device which prints, and the printing is executed.

As mentioned above, if the output sheets and media types supported by the printer have been set, the image process according to the output sheet and media type set as printing conditions is executed. Therefore, when the photo images are output by the printer, the output sheet and media type adapted to the photo paper set in the printer so as to output are correctly selected from the output sheets and media types supported by the printer. By such a method, a user's desired print result can be derived.

However, if the output sheet and media type which are not supported by the printer or the output sheet and media type which are not adapted to the photo paper set in the printer so as to output have been selected, the image process which is not adapted to the photo paper set in the printer is executed. There is, consequently, a risk that an unexpected print result in which print data is partially dropped out, the expected picture quality is not obtained, or the like is caused and the photo paper and ink are wastefully consumed.

According to circumstances, there is also a risk that since the image process or the sheet feeding operation of the printer side which is not adapted to the photo paper set in the printer is executed, an inconvenience of the printer side is also caused.

Therefore, to obtain a desired print result, it is necessary to properly set the output sheet and media type, as printing conditions, adapted to the photo paper set in the printer so as to output. However, to properly set the printing conditions, several subjects exist.

As a first subject, the user has to previously grasp the output sheet and media type adapted to the photo paper onto which the print data is printed and output.

Since characteristics of the printers differ depending on the products, upon outputting the photo image, even if the same photo paper is used, there are many cases where the media types to be set differ depending on the printer. In addition, as for the output sheets and media types supported by the printer, both of the set values for printing a photograph and the set values for printing one of a document and a New Year's card exist.

In consideration of them, the user has to find out the output sheet and media type adapted to the photo paper set in the printer so as to output from the output sheets and media types supported by the printer.

As a method which has hitherto been used for allowing the user to grasp the output sheet and media type adapted to the photo paper set in the printer, the following methods can be mentioned.

1. Description in an electronic manual attached as a package at the time of the purchase of the printer 2. Description on the Home page of the maker which has put the printer on sale 3. Description on a package of the photo paper or in a manual attached together with the photo paper 4. Description on the side which provides a document such as a photo image or the like However, according to the above methods, the user himself has to be aware of a fact that the description has been written and correctly understand the contents and, eventually, the user himself has to set the printing conditions before the print start. Consequently, there is also a possibility of occurrence of an erroneous operation and it is difficult to say that the proper printing conditions could certainly be set. In addition, there is also such a problem that in the case where the user purchases a new printer or the like, he has to grasp the proper printing conditions again, or the like.

As a second subject, each time the application is activated and the printing is executed, the printing conditions have to be set although such a point is not particularly limited to the photo printing.

In the application according to the GDI print path, a possibility that the printing conditions which have been set at a point of time when the document such as a photo image or the like is opened indicate default values which have been predetermined by an outputting apparatus is high. This is because since the printing conditions are not embedded in the document such as a photo image or the like, it is necessary to set other printing conditions as initial settings in place of the above printing conditions.

It is a general case that the default printing conditions which have been predetermined by the outputting apparatus are the set values suitable for document printing. Therefore, when the photo image is printed and output, each time the application is activated (each time the photo image is output), the printing conditions suitable for the photo printing have to be correctly set. It is difficult to say that the use convenience is high.

As mentioned above, according to the XPS document, the document such as a photo image or the like, the printing conditions, and the draw command can be collected as one document file.

Therefore, so long as the user has correctly grasped the output sheet and media type to be set as printing conditions, the XPS document in which the proper printing conditions have been embedded together with the document such as a photo image or the like is preliminarily formed. Consequently, such a troublesomeness that the printing conditions are set again each time the application is activated (each time the photo image is output) can be omitted.

In addition, in the case of providing the document such as a photo image or the like by using the Internet, E-mail, or the like, the XPS document in which the proper printing conditions have previously been embedded together with the document such as a photo image or the like is provided. By using such a method, it is considered that upon printing and outputting, it is unnecessary for the user who received the provided document to be particularly conscious of the setting of the output sheet and media type.

However, there is a case where since the characteristics of the printers differ depending on the products as mentioned above, the media types to be set differ according to the printers. In addition, since the characteristics differ depending on not only the products but also the districts where the products are sold, there is also considered a case where the output sheets which are supported differ depending on the printers.

Therefore, even if the document such as a photo image or the like is provided as an XPS document, a possibility that the output sheet and media type embedded as printing conditions are not adapted to the printer which the user possesses is not so low.

Particularly, in the case of providing the document such as a photo image or the like to an unspecified large number of users like a photograph providing service by the Web site or the like, the users have a variety of printers. In such a case, it can be said that a possibility that the output sheet and media type embedded as printing conditions together with the photo image are not adapted to the printer possessed by the user who received the provided photo image is fairly high.

A case where the output sheet and media type embedded as printing conditions together with the photo image are not adapted to the printer possessed by the user who received the provided photo image is now considered. In such a case, eventually, when the user prints and outputs the photo image, the output sheet and media type adapted to the printer possessed by the user have to be correctly set again as printing conditions.

Even if the side which provided the document such as a photo image or the like has embedded, as an XPS document, the document such as a photo image or the like, the printing conditions, and the draw command, in the case of providing the document to an unspecified large number of users, the foregoing two subjects cannot be improved.

SUMMARY OF THE INVENTION

The invention is made to solve the subjects as mentioned above and it is an object of the invention to provide a mechanism which can derive a proper print result according to printing conditions set by a forming source side of print contents.

According to the invention, therefore, there is provided an information processing apparatus for outputting a document to a printing apparatus, comprising: a discrimination unit configured to discriminate whether or not each of a plurality of set values set for one printing condition is a set value by which a print output can be performed in the printing apparatus; and a decision unit configured to, if a plurality of set values determined by the discrimination unit to be the set values by which the print output can be performed in the printing apparatus exists among the plurality of set values, decide the set values of the printing condition according to a priority added to each of the plurality of set values.

The invention may provide a print setting method, a program, and a storing medium.

Further features of the present invention will become apparent from the following description of exemplary embodiments with reference to the attached drawings.

BRIEF DESCRIPTION OF THE DRAWINGS

FIG. 1 is a diagram illustrating an example of a providing form of a document (print contents) such as a photo image or the like.

FIG. 10 is a flow chart showing details of a printing condition deciding process of step S902 shown in FIG. 9.

FIG. 11 is a diagram illustrating an example of a result 1100 of a printing condition decided by the UID 403 by the printing condition deciding process in the case where a plurality of printing apparatuses 202 has executed a print output to the XPS document in which the print ticket 600 illustrated in FIG. 6 has been set.

FIG. 12 is a diagram illustrating an example of a print ticket 1200 obtained after the printing condition deciding process in the case where the UID 403 has executed the printing condition deciding process to the print ticket 600 illustrated in FIG. 6.

FIG. 13 is a diagram illustrating an example of a print ticket 1300 set as a printing condition into the XPS document.

FIG. 14 is a diagram illustrating an example of a relationship 2100 between a layout adjusting method which can be set by the print ticket 1300 illustrated in FIG. 13 and the contents of a layout correcting process in a PPF 407.

FIG. 27 is a diagram for describing a memory map in a storing medium in which various data processing programs that can be read out by the host computer 201 are stored.

DESCRIPTION OF THE EMBODIMENTS

Embodiments of the invention will be described hereinbelow with reference to the drawings.

(First Embodiment)

<Description of System Construction>

Figure 1:
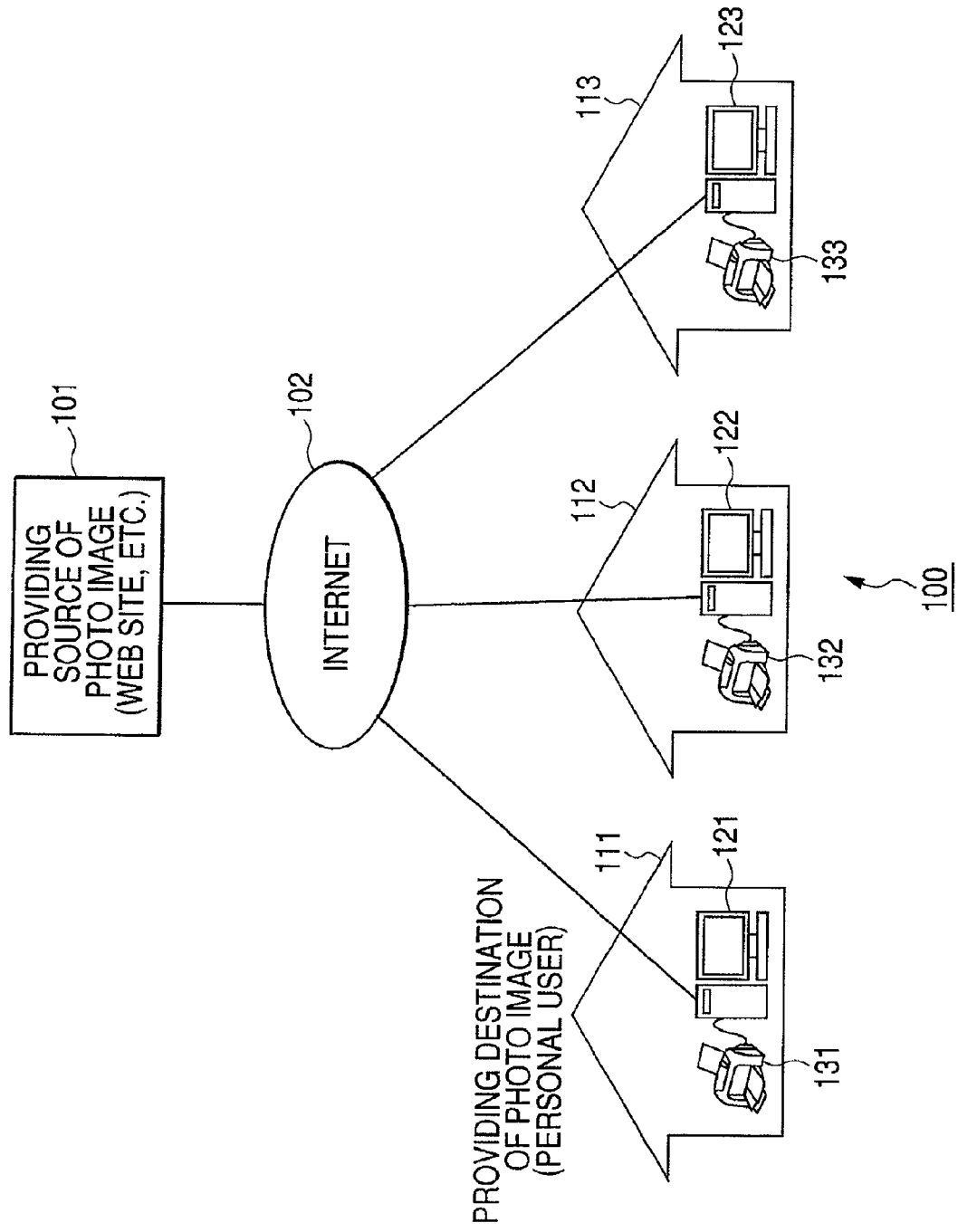

FIG. 1 is a diagram illustrating an example of a providing form of a document (print contents) such as a photo image or the like. In a providing form 100, a provider 101 of the photo image provides and distributes the photo images to an unspecified large number of users 111, 112, and 113 through an Internet 102. Actually, the photo images are provided to information terminal apparatuses 121, 122, and 123 such as personal computers or the like which are used by the users.

The users can print and output the photo images held in the information terminal apparatuses 121, 122, and 123 by printing apparatuses (or printers) 131, 132, and 133 at arbitrary timing.

Figure 2:
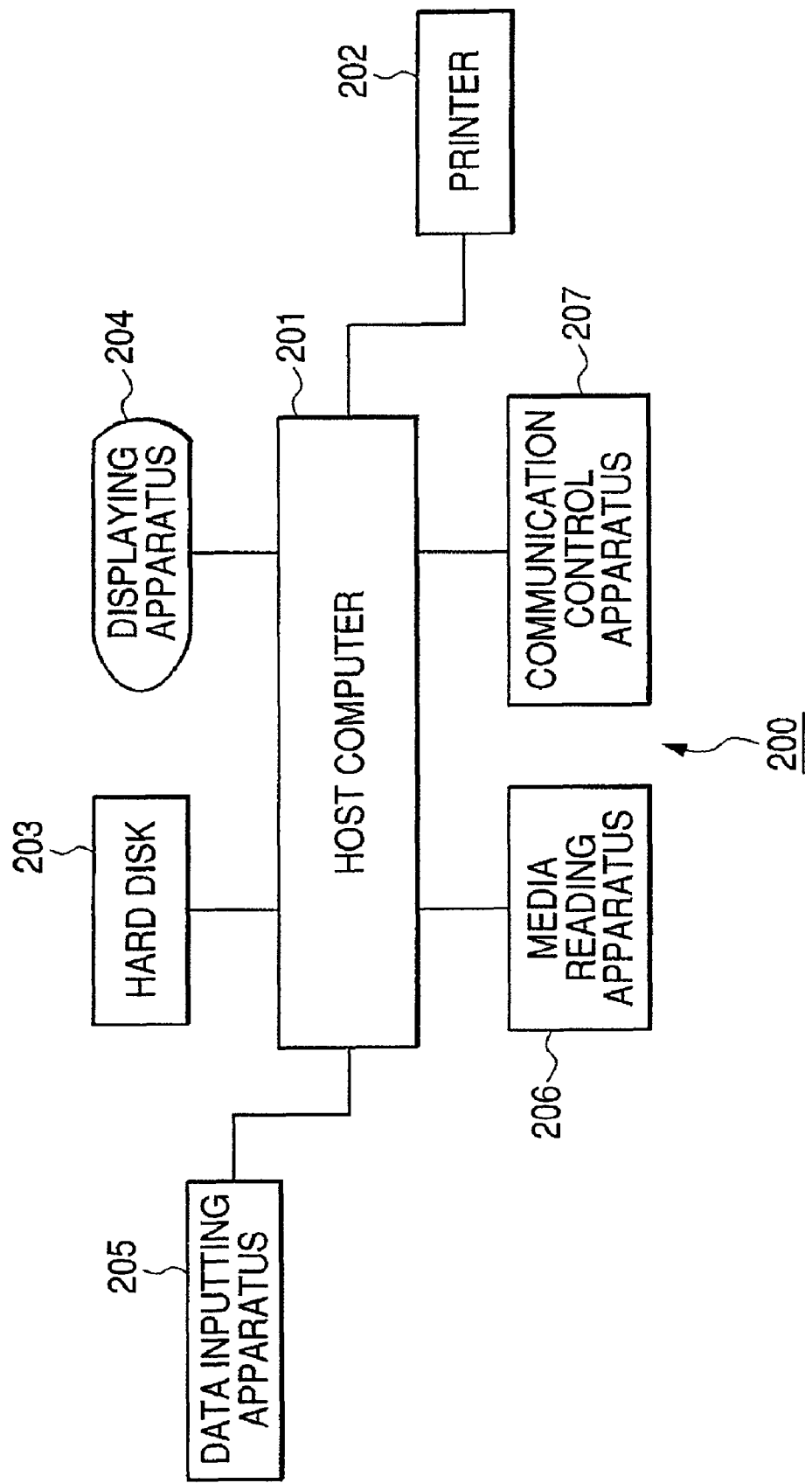
FIG. 2 is a block diagram for describing a construction of a print system which is applied to an information processing apparatus.

FIG. 2 is a block diagram for describing a construction of a print system which is applied to an information processing apparatus. According to a print system 200 in the embodiment, a document such as a text, a photo image, or the like stored in the personal computer or the like is printed and output onto a print sheet by a printing apparatus (printer) 202. Upon print outputting, the printer 202 makes print control according to printing conditions set at the time of execution of the printing.

A construction and the operation of the print system 200 in the embodiment will be more specifically described hereinbelow.

<Whole Construction of Print System 200>

In FIG. 2, the print system 200 is constructed by connecting the printer 202, a hard disk 203, a displaying apparatus 204, a data inputting apparatus 205, a media reading apparatus 206, and a communication control apparatus 207 to a host computer 201, respectively.

The host computer 201 executes a predetermined system program, thereby making operation control of the whole print system 200 and monitoring the print system 200.

More specifically speaking, for example, the host computer 201 includes a CPU, a RAM, a ROM, and the like arranged on a system board as will be described hereinafter, and has a computer function. The CPU of the host computer 201 properly reads out a desired processing program from a built-in memory, the hard disk 203 which has externally been attached, or the like and executes it, thereby controlling the operation of the whole print system 200.

As an example here, a storing destination of the various programs which are executed by the host computer 201 is assumed to be the hard disk 203. A processing program to realize the operation in the embodiment, various applications to form print data, and the like have been stored in the hard disk 203.

A storing destination of the processing programs (program codes) to realize the operation in the embodiment is not limited to the hard disk 203 or the built-in memory. For example, the processing programs are stored onto a portable storing medium such as CD-ROM, flexible disk, or the like in a form in which the processing programs can be read out by the host computer 201 and are circulated. When the print system 200 is constructed, the host computer 201 may read out the processing programs through one of the media reading apparatus 206 and the communication control apparatus 207 and install them onto the hard disk 203.

In the embodiment, although it is assumed that, for example, "Windows (registered trademark)" is used as an OS (Operating System) of the host computer 201, the embodiment is not limited to it.

When information such as set contents of the printing conditions and the like is received together with the print data from the host computer 201, the printer 202 executes a predetermined printing process, thereby printing and outputting the print data (forming an image) onto the print sheet.

The printing process of the printer 202 may be a process of such a type that a raster image is formed by a host base, raster image data is received, and the printing is performed. The printing process of the printer 202 may be a process of such a type that after PDL data based on a page description language was received and analyzed, the data is developed into a raster image and the printing is performed.

As a printer 202, for example, various printers such as serial printer, page printer, electronic copying type printer, and the like can be applied. As for a connecting form between the printer 202 and the host computer 201, for example, various connecting forms such as stand-alone connection, network connection, and the like can be applied.

The displaying apparatus 204 displays a predetermined window under the management of the OS in response to an instruction which is issued from the host computer 201 based on the execution of the system program, application, or the like.

The data inputting apparatus 205 includes a keyboard, a mouse, another pointing device, and the like, receives various instructions from the user, and transfers them to the host computer 201. For example, the data inputting apparatus 205 transfers the set contents of the printing conditions for the printer 202 which have been input from the user to the host computer 201.

The media reading apparatus 206 includes a CD-ROM drive, a flexible disk (FD) drive, and the like and supplies the information read out of the storing medium such as CD-ROM, FD, or the like to the host computer 201.

The communication control apparatus 207 is a connecting interface for connecting, for example, the print system 200 and an external network so that they can communicate. The printer 202 may be connected to the host computer 201 through the communication control apparatus 207 and the network.

<Functional Construction of Print System 200>

Figure 3:
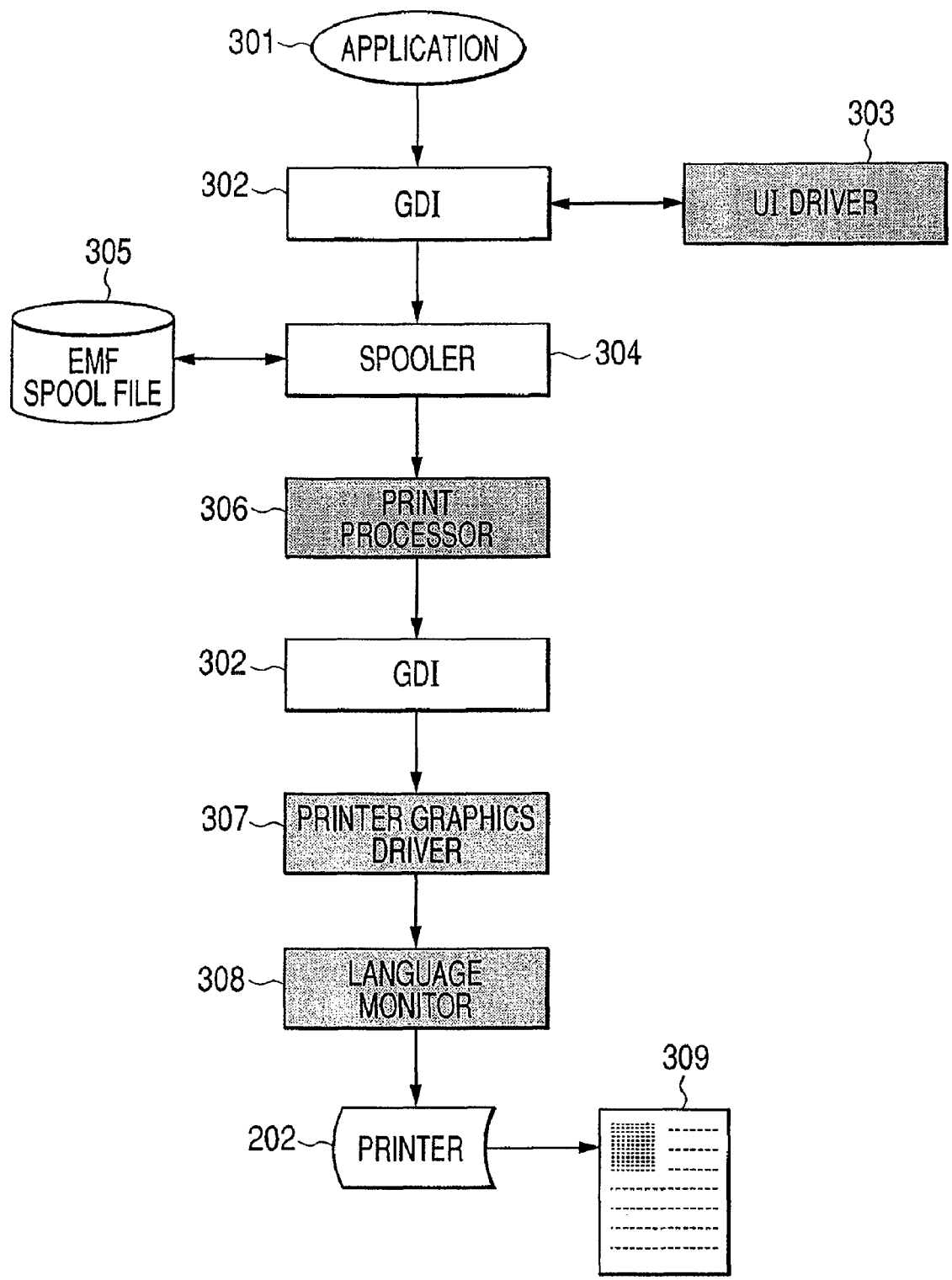
FIG. 3 is a diagram illustrating an example in the case where a print control function by a host computer 201 is executed according to a GDI print path.
Figure 4:
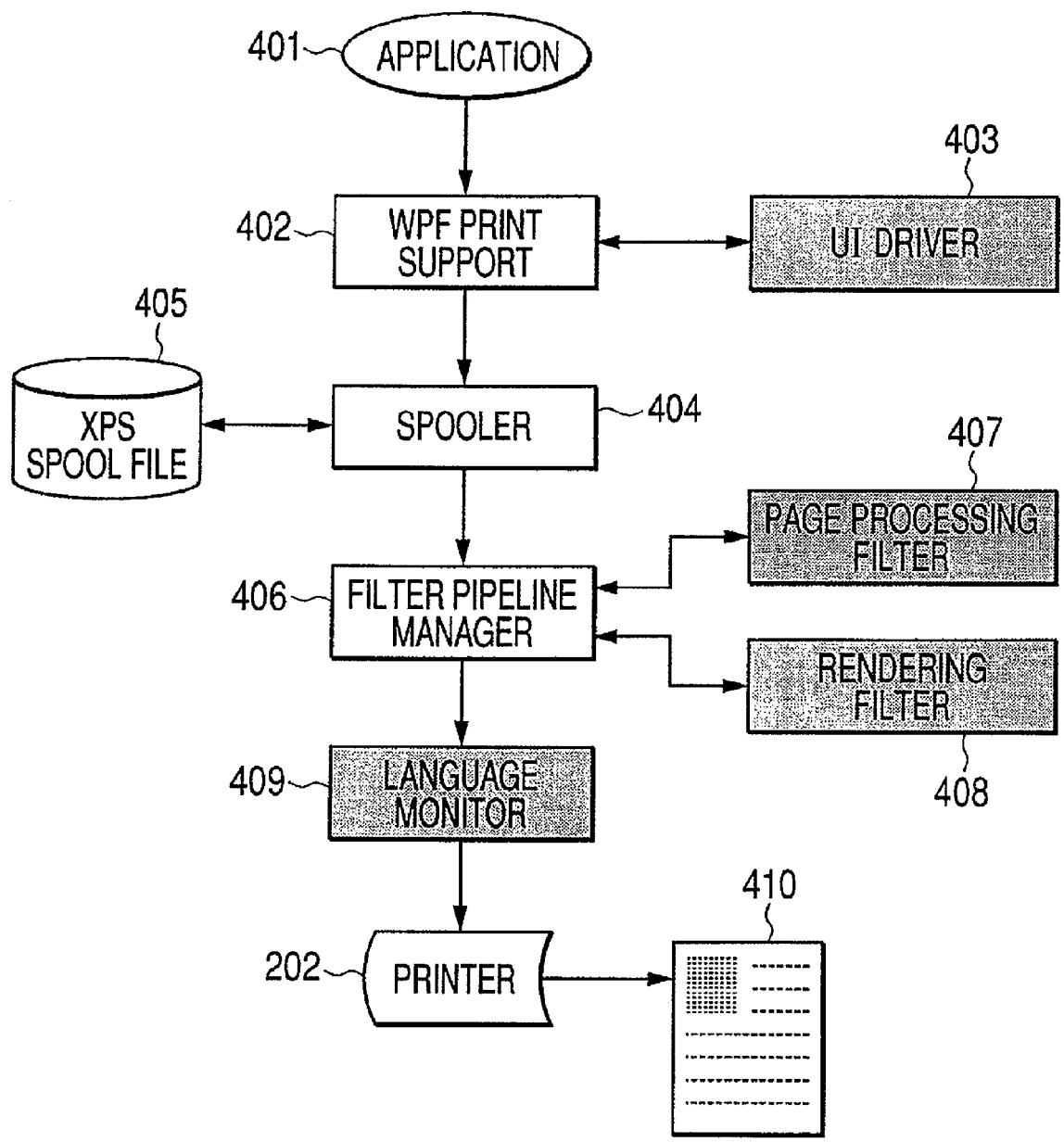
FIG. 4 is a diagram illustrating an example in the case where the print control function by the host computer 201 is executed according to an XPS print path.

FIGS. 3 and 4 are block diagrams for describing a printing function of the host computer 201 illustrated in FIG. 2. FIGS. 3 and 4 are also the block diagrams for describing, particularly, a print control function among functions of the print system 200 which are realized by executing predetermined processing programs.

<Functional Construction of Print System 200—Example of GDI Print Path>

FIG. 3 is a diagram illustrating an example in the case where the print control function by the host computer 201 is executed according to the GDI print path.

In FIG. 3, the print control function by the host computer 201 includes eight print function processing units. The print control function in the GDI print path includes an application (AP) 301, a GDI 302, a user interface driver (UID) 303, a spooler (SPL) 304, an EMF spool file 305, and a print processor (PP) 306. The print control function in the GDI print path also includes a printer graphics driver (PGD) 307 and a language monitor (LM) 308.

First, main functions of each of the print function processing units included in the print control function in the GDI print path will be described.

The AP 301 sets the print conditions into the printer 202 through the GDI 302. More specifically describing, the AP 301 sets, for example, a size (output sheet) and a type (media type) of the sheet (paper) which is used for printing and other printing conditions.

Further, the AP 301 issues a draw command of the document, photo image, or the like to the printer 202, thereby instructing the print execution. In the description of FIG. 3, the document/image data and the draw command which are notified to the spooler 304 through the GDI 302 in response to the issuance of the draw command are generally called "print data" hereinbelow.

The UID 303 changes the printing conditions notified through the GDI 302 into the contents adapted to the printer 202 and decides the final printing conditions. Further, through the GDI 302, the UID 303 notifies the spooler of the printing conditions which have finally been determined.

The spooler 304 stores the print data and the printing conditions which have been notified through the GDI 302 into the EMF spool file 305.

The PP 306 processes the print data stored in the EMF spool file 305 one page by one.

The PGD 307 converts the print data into bitmap data (raster image data) which can be printed and output by the printer 202.

The LM 308 bidirectionally communicates with the printer 202, obtains the information of the printer 202, and displays onto the displaying apparatus 204. The LM 308 also supplies the bitmap data formed by the PGD 307 to the printer 202. The LM 308 can also use a different bitmap data transferring method according to a capacity of a memory provided for the printer 202 and a construction of an engine controller.

A series of operations of the print control function in the GDI print path will now be described.

First, the AP 301 instructs the setting of the printing conditions and the print execution of an arbitrary document, photo image, or the like in response to an operating instruction from the user.

In this manner, when the print executing instruction is received from the AP 301, the GDI 302 notifies the UID 303 of the set contents of the printing conditions in the printer 202 and a print start event.

When the notification of the set contents of the printing conditions in the printer 202 is received, the UID 303 refers to the notified set contents of the printing conditions and discriminates whether or not the notified set contents are the set contents which enable the print data to be printed and output by the printer 202.

If it is determined here that the notified set contents of the printing conditions are not the set contents which enable the print data to be printed and output by the printer 202, the UID 303 partially updates the set contents of the printing conditions so as to obtain the set contents which enable the print data to be printed and output by the printer 202 and determines the printing conditions.

Subsequently, the AP 301 issues the draw command of the document/image data through the GDI 302. When the notification of the print data formed in association with the issuance of the draw command in the AP 301 and the printing conditions decided by the UID 303 is received, the spooler 304 stores the notified print data and printing conditions into the EMF spool file 305.

The PP 306 obtains the set contents of the printing conditions and the print data from the EMF spool file 305.

Subsequently, the PP 306 supplies the set contents of the printing conditions and the print data one page by one to the PGD 307 through the GDI 302.

When the print data is supplied from the PP 306 to the PGD 307, the GDI 302 converts the draw command included in the print data into a graphics draw command.

The PGD 307 executes an image process and the like to the print data supplied from the PP 306 based on the graphics draw command formed by the GDI 302 and the set contents of the printing conditions notified from the GDI 302. The PGD 307 forms bitmap data for printing (hereinbelow, called "print image data").

Subsequently, the PGD 307 converts the print image data subjected to the image process and the like into a data format which can be interpreted by the printer (hereinbelow, such a data format is called a "print command").

The LM 308 supplies the print command sent by the PGD 307 to the printer 202 through the interface used to transmit the print command from the host computer 201 to the printer 202.

The printer 202 interprets the print command supplied from the LM 308 and prints and outputs the print image data onto a sheet (paper) 309.

<Functional Construction of Print System 200—Example of XPS Print Path>

FIG. 4 is a diagram illustrating an example in the case where the print control function by the host computer 201 is executed according to the XPS print path. It is assumed that the print control function of the embodiment is executed according to the XPS print path.

In FIG. 4, the print control function by the host computer 201 includes nine print function processing units.

The print control function in the XPS print path includes an application (AP) 401, a WPF (Windows (registered trademark) Presentation Foundation) print support (WPFPS) 402. The print control function in the XPS print path also includes a user interface driver (UID) 403, a spooler (SPL) 404, an XPS spool file 405, and a filter pipeline manager (FPM) 406. The print control function in the XPS print path further includes a page processing filter (PPF) 407, a rendering filter (RF) 408, and a language monitor (LM) 409.

First, main functions of each of the print function processing units included in the print control function in the XPS print path will be described.

The AP 401 forms an XPS document through the WPFPS 402. The AP 401 sets one of a document such as a text, a photo image, or the like, the printing conditions, and the draw command into the XPS document. One of the documents such as a text, a photo image, or the like and the draw command included in the XPS document are generally called "print data".

Further, the AP 401 instructs the print execution through the WPFPS 402.

The WPFPS 402 constructs the XPS document in response to the instruction from the AP 401. The WPFPS 402 extracts the set contents of the printing conditions from the XPS document and notifies the UID 403 of the set contents. The WPFPS 402 sets the set contents of the printing conditions decided by the UID 403 into the XPS document.

Further, the WPFPS 402 notifies the spooler 404 of the XPS document.

The UID 403 changes the printing conditions notified from the WPFPS 402 into the contents adapted to the printer 202 and decides the final printing conditions. Further, the UID 403 notifies the WPFPS 402 of the printing conditions which have finally been determined.

The spooler 404 stores the XPS document notified from the WPFPS 402 into the XPS spool file 405.

Through the PPF 407 and the RF 408, the FPM 406 converts the XPS document stored in the XPS spool file 405 into the bitmap data (raster image data) which can be printed and output by the printer 202. The FPM 406 supplies the bitmap data to the printer 202.

The PPF 407 edits the print data in the XPS document and page construction.

The RF 408 converts the print data in the XPS document edited by the PPF 407 into the bitmap data (raster image data) which can be printed and output by the printer 202.

The LM 409 bidirectionally communicates with the printer 202, obtains the information of the printer 202, and displays onto the displaying apparatus 204. The LM 409 also supplies the bitmap data notified from the FPM 406 to the printer 202. The LM 409 can also use a different bitmap data transferring method according to the capacity of the memory provided for the printer 202 and the construction of the engine controller.

A series of operations of the print control function in the XPS print path will now be described.

First, the AP 401 reads out one of an arbitrary document and the document such as a photo image or the like in response to the operating instruction from the user. The XPS document has previously been formed is also incorporated in the foregoing arbitrary document.

Subsequently, the AP 401 forms the XPS document in response to the operating instruction from the user and sets one of the documents such as a text, a photo image, or the like, the printing conditions, and the draw command into the XPS document. If the XPS document which has previously been formed is read out, an XPS document is not newly formed and it is sufficient that the AP 401 edits the printing conditions and the draw command included in the read-out XPS document in response to the operating instruction from the user.

In the XPS print path, the printing conditions are set by using an XML file described according to a format of an XML schema which has previously been defined. The format of the XML schema which has previously been defined to make the print setting is called a "print schema". The XML file in which the printing conditions have been described according to the print schema is called a "print ticket".

Subsequently, the AP 401 instructs the print execution by using the XPS document in response to the operating instruction from the user.

When the instruction for the print execution is received from the AP 401, the WPFPS 402 extracts the print ticket in the XPS document and notifies the UID 403 of the print ticket as set contents of the printing conditions.

When the notification of the set contents of the printing conditions in the printer 202 is received, the UID 403 refers to the notified set contents of the printing conditions and discriminates whether or not the set contents are the set contents which enable the print data to be printed and output by the printer 202 (discrimination unit).

If it is determined here that the notified set contents of the printing conditions are not the set contents which enable the print data to be printed and output by the printer 202, the UID 403 partially updates the set contents of the printing conditions so as to obtain the set contents which enable the print data to be printed and output by the printer 202 and determines the printing conditions (decision unit). Such a process is called a "printing condition deciding process" hereinbelow.

Subsequently, the UID 403 updates the print ticket according to the decided printing conditions and notifies the WPFPS 402 of the updated print ticket. The WPFPS 402 sets the print ticket notified from the UID 403 into the XPS document and notifies the spooler 404 of the XPS document.

When the notification of the XPS document is received from the WPFPS 402, the spooler 404 stores the notified XPS document into the XPS spool file 405.

Subsequently, the spooler 404 notifies the FPM 406 of the print start event. When the notification of the print start event is received from the spooler 404, the FPM 406 obtains the XPS document stored in the XPS spool file 405 and notifies the PPF 407 of the XPS document.

The PPF 407 obtains the print data and the print ticket from the notified XPS document.

Subsequently, the PPF 407 edits the print data and edits the page construction of the XPS document based on the set contents of the printing conditions described in the print ticket. A synthesization (watermark) of a bitmap, a page synthesization (layout), a change in page order (descending order), and the like are included in the edition contents of the print data and the page construction.

Subsequently, the PPF 407 notifies the FPM 406 of the XPS document obtained after completion of the edition of the print data and the page construction.

The FPM 406 notifies the RF 408 of the XPS document notified from the PPF 407.

The RF 408 obtains the print data and the print ticket from the notified XPS document.

Subsequently, the RF 408 executes the image process and the like to the print data based on set contents of the printing conditions described in the print ticket, thereby forming the bitmap data for printing (hereinbelow, called a "print image data") (image processing unit).

Subsequently, the RF 408 converts the print image data subjected to the image process and the like into a data format which can be interpreted by the printer (hereinbelow, such a data format is called a "print command") and notifies the FPM 406 of this print command.

The FPM 406 supplies the print command notified from the RF 408 to the LM 409.

The LM 409 supplies the print command sent from the FPM 406 to the printer 202 through the interface which is used to transmit the print command from the host computer 201 to the printer 202.

The printer 202 interprets the print command supplied from the LM 409 and prints and outputs the print image data onto a sheet (paper) 410.

<Printing Condition Deciding Process>

Subsequently, details of the printing condition deciding process which is executed by the UID 403 in the embodiment will be described, particularly, by paying an attention to the deciding process of the media type here.

When the notification of the print ticket is received from the WPFPS 402, the UID 403 obtains the set value of the media type described in the print ticket and forms a media type condition set value list, which will be described in detail hereinafter.

If a plurality of set values of the media types described in the print ticket exists, the UID 403 also obtains priority information of each set value and stores into the media type condition set value list. Further, the UID 403 rearranges the set values of the media types stored in the media type condition set value list in order from the higher priority.

Subsequently, the UID 403 refers to a support media type list information table which has previously been held and discriminates whether or not each of the media type set values stored in the media type condition set value list has been included in the support media type list information table.

The UID 403 determines the set value having the highest priority, as a final media type, among the set values determined to be included in the support media type list information table among the media type set values stored in the media type condition set value list.

<Construction of XPS Document>

Figure 5:
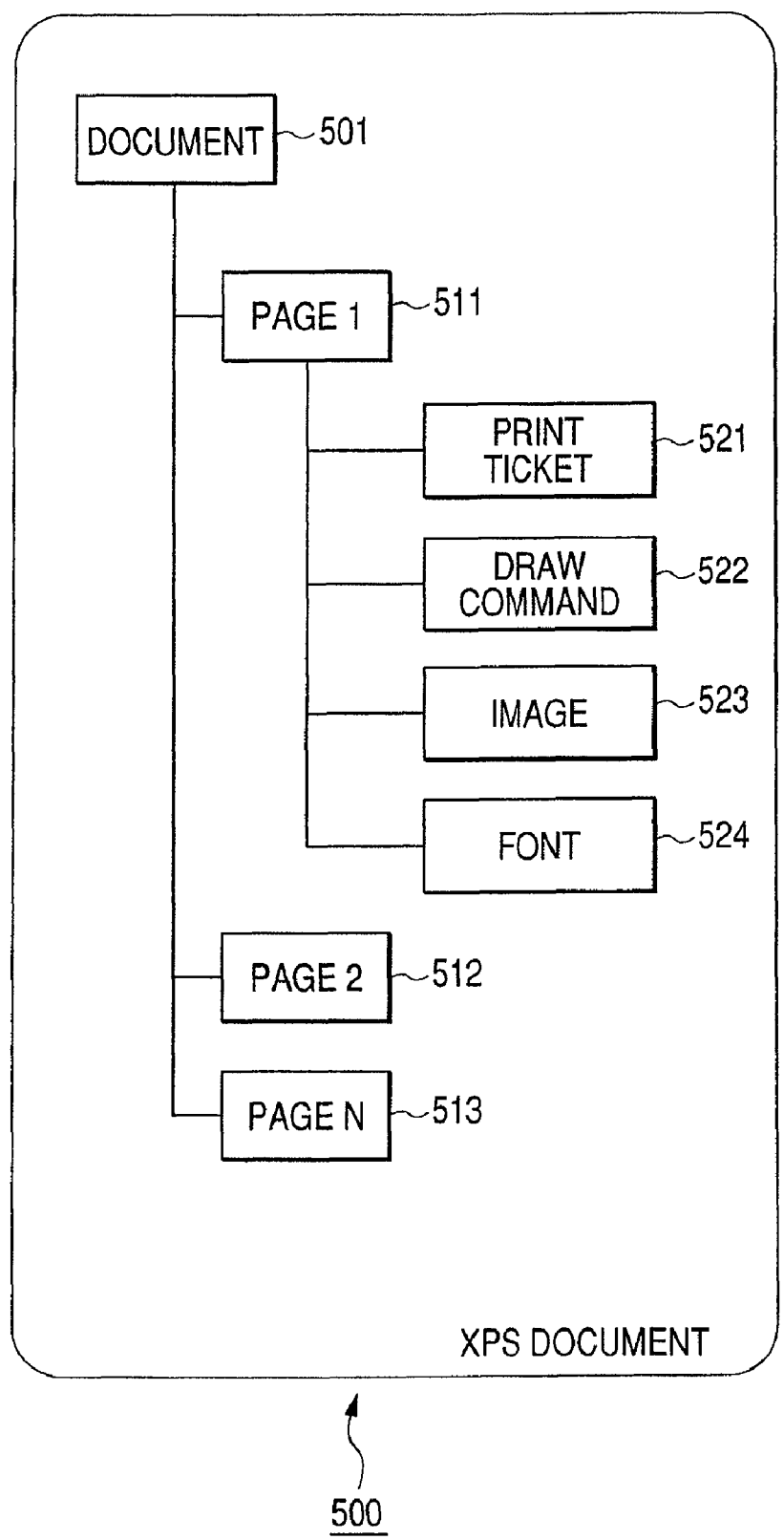
FIG. 5 is a diagram illustrating an example of a file construction of an XPS document 500.

FIG. 5 is a diagram illustrating an example of a file construction of an XPS document 500.

As illustrated in FIG. 5, the XPS document 500 includes a document 501, pages 511 to 513, a print ticket 521, a draw command 522, an image 523, and a font 524. Each of the pages 511 to 513 corresponds to one sheet (one page) which is printed and output. The print ticket 521, draw command 522, image 523, and font 524 exist for each page.

<Example of Print Ticket>

Figure 6:
FIG. 6 is a diagram illustrating an example of a print ticket 600 set as a printing condition into the XPS document.

FIG. 6 is a diagram illustrating an example of a print ticket 600 set as a printing condition into the XPS document. In the example of the print ticket 600 illustrated in FIG. 6, the media type has been set as a printing condition. In the example of FIG. 6, the four set values added with the priorities have been set.

<Example of Media Type Condition Set Value List>

Figure 7:
FIG. 7 is a diagram illustrating an example of a media type condition set value list 700 which is formed by a UID 403 illustrated in FIG. 4.

FIG. 7 is a diagram illustrating an example of a media type condition set value list 700 which is formed by the UID 403 illustrated in FIG. 4.

In the example of the media type condition set value list 700 illustrated in FIG. 7, information of the set values of the media types set in the print ticket 600 illustrated in FIG. 6 and the priorities has been stored.

<Example of Support Media Type List Information Table>

Figures 8, 9:
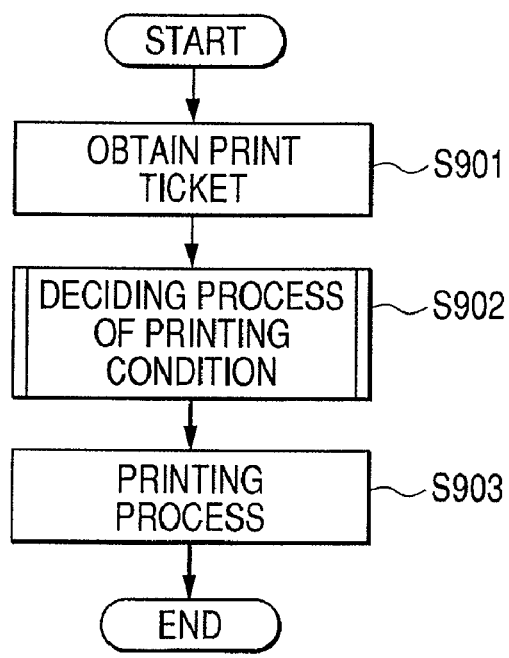
FIG. 8 is a diagram illustrating an example of a support media type list information table 800 held in the UID 403 illustrated in FIG. 4.
FIG. 9 is a flow chart showing an example of a data processing procedure (part 1).

FIG. 8 is a diagram illustrating an example of a support media type list information table 800 held in the UID 403 illustrated in FIG. 4.

In FIG. 8, in the example of the support media type list information table 800, media types of the media which can be printed and output by the printer 202 are listed. Specifically speaking, names of the set values of the default media types and information about whether or not the media type is the default media type have been stored. The names of the set values are used for the UID 403 to specify the media type from the contents of the set values set in the print ticket.

The support media type list information table has been stored in, for example, the hard disk 203 or the like. If there is a plurality of printers, the support media type list information table has been stored in the hard disk 203 or the like every ID of the printer.

<Operation of Print System 200>

FIG. 9 is a flow chart showing an example of a data processing procedure (part 1). S901 to S903 indicate processing steps. Each step is realized by a method whereby the CPU of the host computer 201 loads a control program from an external storing apparatus or the like into a memory and executes the control program.

First, in step S901, the UID 403 obtains the print ticket as set contents of the printing conditions from the WPFPS 402.

In step S902, by the printing condition deciding process, the UID 403 decides the printing conditions in which the print data can be printed and output by the printer 202. Details of the process in S902 are shown in FIG. 10, which will be described hereinafter.

Subsequently, in step S903, the printing process (image process and the like) is executed based on the set contents of the printing conditions decided in step S902 and the processing routine is finished.

FIG. 10 is a flow chart showing the details of the printing condition deciding process of step S902 shown in FIG. 9. This process relates to an example of a process which is executed by paying an attention to, particularly, the media type in the printing condition deciding process which is executed by the UID 403 as an operation of the print system 200.

S1001 to S1011 indicate processing steps. Each step is realized by a method whereby the CPU of the host computer 201 loads a control program from the external storing apparatus or the like into the memory and executes the control program.

First, in step S1001, the UID 403 obtains the set values of the media types from the print ticket which has previously been obtained in step S901.

Subsequently, in step S1002, the UID 403 obtains the total number (N) of set values of the media types obtained in step S1001.

Subsequently, in step S1003, the UID 403 forms a media type condition set value list (A) in which the set values of the number as many as the total number (N) of set values of the media types obtained in step S1002 can be stored. The UID 403 stores the set values of the media types obtained in step S1001 into the media type condition set value list (A) in order from the higher priority.

Subsequently, in step S1004, the UID 403 refers to the support media type list information table 800 illustrated in FIG. 8 and obtains a list (B) of the media types of the media, as an example of set value resource information, which can be printed and output by the printer 202.

In steps S1006 to S1009, a searching process of the media type to be finally decided is executed by repeating the process the number of times as many as the total number (N) of set values of the media types obtained in step S1002. Therefore, in step S1005, the UID 403 initializes a count value of a processing counter to "1".

Subsequently, in step S1006, the UID 403 discriminates whether or not the count value of the processing counter is equal to or less than the total number (N) of set values of the media types obtained in step S1002. As a result of the discrimination, if the UID 403 determines that the count value of the processing counter is equal to or less than the total number (N) of set values of the media types obtained in step S1002 (that is, YES in step S1006), the processing routine advances to step S1007. If the UID 403 determines that the count value is larger than the total number (N) (that is, NO in step S1006), the processing routine advances to step S1011.

In step S1007, the UID 403 refers to the media type condition set value list (A) formed in step S1003 and obtains the set value of the media type having the same priority as that of the count value of the processing counter.

Subsequently, in step S1008, the UID 403 discriminates whether or not the set value of the media type obtained in step S1007 is included in the list (B) (obtained in step S1004) of the media types of the media which can be printed and output by the printer 202.

As a result of the discrimination, if the UID 403 determines that the set value of the media type obtained in step S1007 is included in the list (B) of the media types of the media which can be printed and output by the printer 202, step S1010 follows. If the UID 403 determines that the set value is not included, step S1009 follows.

In step S1009, the UID 403 increases the count value of the processing counter by one. The processing routine is returned to step S1006.

In step S1010, the UID 403 decides the media type obtained in step S1007 as a final printing condition and updates the print ticket. The processing routine is finished.

In step S1011, the UID 403 refers to the support media type list information table 800 illustrated in FIG. 8 and obtains the predetermined default media type from the list of the media types of the media which can be printed and output by the printer 202. The UID 403 decides the default media type as a final printing condition and updates the print ticket. The processing routine is finished.

Thus, even if the media type to be set according to characteristics of the printer differs, the media type adapted to each printer is searched for from a plurality of media types set in the print ticket and can be decided as a final printing condition. Since the image process is executed based on the decided printing condition, the user can obtain a desired print result.

<Example of Result of Printing Condition Deciding Process>

FIG. 11 is a diagram illustrating an example of a result 1100 of the printing conditions decided by the UID 403 by the printing condition deciding process in the case where a plurality of printers 202 has executed the print output to the XPS document in which the print ticket 600 illustrated in FIG. 6 has been set.

The example illustrated in FIG. 11 relates to an example of a result which is obtained by paying an attention to, particularly, the media type among the printing conditions decided by the UID 403 by the printing condition deciding process.

<Example of Print Ticket after Printing Condition Deciding Process>

FIG. 12 is a diagram illustrating an example of a print ticket 1200 obtained after the printing condition deciding process in the case where the UID 403 has executed the printing condition deciding process to the print ticket 600 illustrated in FIG. 6.

As mentioned above, according to the embodiment, when the document such as a photo image or the like is provided and distributed to an unspecified large number of users through the Internet, memory card, or the like, the printing conditions which can be adapted to a number of printers can be preset by using the XPS document.

Further, when the XPS document is printed and output from an arbitrary printer, the printing conditions adapted to the printer for executing the print output are applied and the image process is executed. Therefore, the user who has received the provided XPS document can obtain a desired print result merely by executing the print output from the arbitrary printer without particularly being aware of the setting of the printing conditions such as output sheet, media type, and the like.

The provider who provides the document such as a photo image or the like to an unspecified large number of users presumes the printers which are used for the users to print and output and the sheets which are often used when the provided document such as a photo image or the like is printed and output from those printers. It is sufficient for the provider to set a plurality of set values with the priorities as printing conditions into the XPS document.

(Second Embodiment)

The first embodiment has been described with respect to the example in which when the document such as a photo image or the like is provided and distributed to an unspecified large number of users through the Internet, memory card, or the like, as printing conditions which can be adapted to a number of printers, a plurality of set values with the priorities are set into the XPS document. Further, when the distributed XPS document is printed and output, the set value having the highest priority among a plurality of set values which can be used by the printer among the set values set in the XPS document is determined as a final printing condition, and the image process is executed based on the decided printing condition. Thus, the user who has received the provided XPS document can obtain a desired print result merely by executing the print output from the arbitrary printer without particularly being aware of the setting of the printing conditions such as output sheet, media type, and the like.

For example, when an attention is paid to the media type as a printing condition, the media type which can be used by the printer is selected and applied from a plurality of set values set in the XPS document. Since the image process is executed based on the applied media type, the picture quality as expected can be obtained.

When an attention is paid to the output sheet as a printing condition, even if the output sheet which can be used in the printer is merely applied, it is not adequate. For example, if an aspect ratio of the applied output sheet and that of the photo image differ, such a situation that an area where no images are arranged on the output sheet remains, a part of the image is not arranged on the output sheet (a part of the image is dropped out), or the like occurs.

If the area where no images are arranged on the output sheet remains, although the whole original photo image itself has been output, it is difficult to say that a style as a "photograph" remains in appearance. There is a possibility that the user determines that a desired print result is not obtained.

In the case where a part of the image is not arranged on the output sheet, if an object in the photo image (portion which is particularly important as a "photograph") is partially dropped out, naturally, the user determines that a desired print result is not obtained.

As mentioned above, when an attention is paid to the output sheet as a printing condition, there remains a possibility that the print result which the user does not desire is caused depending on the layout method of the document onto the output sheet applied by the first embodiment.

Therefore, the second embodiment will be described with respect to an example in which the layout adjusting method which is executed when it is applied as a final printing condition by the first embodiment is preliminarily set for each of a plurality of set values with the priorities set in the XPS document.

Further, an example of deciding a layout of the document based on the document such as a photo image or the like, the set value applied as a final printing condition by the first embodiment, and the layout adjusting method set for the set value will be described.

Description of the portions common to those in the first embodiment, for example, in FIGS. 1, 2, and the like is omitted here. However, the processes of FIG. 9 are unique to the first embodiment and processes of FIG. 17, which will be described hereinafter, are executed in the second embodiment in place of FIG. 9. More specifically speaking, when the notification of the XPS document is received from the FPM 406, the PPF 407 executes a layout correcting process, which will be described hereinafter, prior to the edition of the print data and the edition of the page construction of the XPS document.

<Layout Correcting Process>
Subsequently, details of the layout correcting process which is executed by the PPF 407 in the embodiment will be described.

First, the PPF 407 obtains the print data and the print ticket from the XPS document notified from the FPM 406. Subsequently, the PPF 407 obtains the settings of the output sheet described in the print ticket.

Subsequently, the PPF 407 obtains the priorities associated with the set values of the output sheet and the layout adjusting method. Further, the PPF 407 calculates a drawing start position of the print data based on the settings of the output sheet, the priorities, and the layout adjusting method which have been obtained.

The PPF 407 edits the print data based on the calculated drawing start position prior to the edition of the print data and the edition of the page construction of the XPS document. More specifically speaking, the PPF 407 changes the draw command included in the print data based on the calculated drawing start position.

<Example of Print Ticket>
FIG. 13 is a diagram illustrating an example of a print ticket 1300 set as a printing condition into the XPS document.

In the example of the print ticket 1300 illustrated in FIG. 13, the setting of the output sheet has been made as a printing condition. In the example of the print ticket 1300 illustrated in FIG. 13, the two set values added with the priorities have been set.

In the example of the print ticket 1300 illustrated in FIG. 13, "Centering" has been set as a layout adjusting method in the case where "LPhoto (L size)" as a second priority has been applied.

<Example of Layout Adjusting Method>
FIG. 14 is a diagram illustrating an example of a relationship 2100 between the layout adjusting method which can be set by the print ticket 1300 illustrated in FIG. 13 and the contents of the layout correcting process in the PPF 407. If "Centering" has been set as a layout adjusting method, the PPF 407 calculates the drawing start position so that a center position of the document such as a photo image or the like is located to a center position on the output sheet. Therefore, when the object in the photo image (portion which is particularly important as a "photograph") is located at the center of the photo image, it is desirable to set "Centering" as a layout adjusting method.

Figure 15:
FIG. 15 is a diagram illustrating an example of an output sheet condition set value list 1400 which is formed by the UID 403 illustrated in FIG. 4 by the printing condition deciding process on an output sheet.

<Example of Output Sheet Condition Set Value List>
FIG. 15 is a diagram illustrating an example of an output sheet condition set value list 1400 which is formed by the UID 403 illustrated in FIG. 4 by the printing condition deciding process on the output sheet.

In the example of the output sheet condition set value list 1400 illustrated in FIG. 15, information of the set values of the output sheet, the priorities, and the layout adjusting method which have been set in the print ticket 1300 illustrated in FIG. 13 has been stored.

In the example of the output sheet condition set value list 1400, if the layout adjusting method is not set in the print ticket 1300 illustrated in FIG. 13, the UID 403 sets "None" as a layout adjusting method.

Figure 16:
FIG. 16 is a diagram illustrating an example of a support output sheet list information table 1500 held in the UID 403 illustrated in FIG. 4.

<Example of Support Output Sheet List Information Table>
FIG. 16 is a diagram illustrating an example of a support output sheet list information table 1500 held in the UID 403 illustrated in FIG. 4.

In the example of the support output sheet list information table 1500 illustrated in FIG. 16, the output sheets which can be printed and output by the printer 202 are listed. More specifically speaking, in the example of the support output sheet list information table 1500 illustrated in FIG. 16, information regarding names of the set values in each output sheet, an external shape (width, height) of the sheet, and whether or not the sheet is a regular output sheet has been stored. The names of the set values are used for the UID 403 to specify the output sheet from the contents of the set values set in the print ticket.

The support output sheet list information table has been stored in, for example, the hard disk 203 or the like. If there is a plurality of printers, the support output sheet list information table is provided every ID of the printer.

<Operation of Print System 200>

Figure 17:
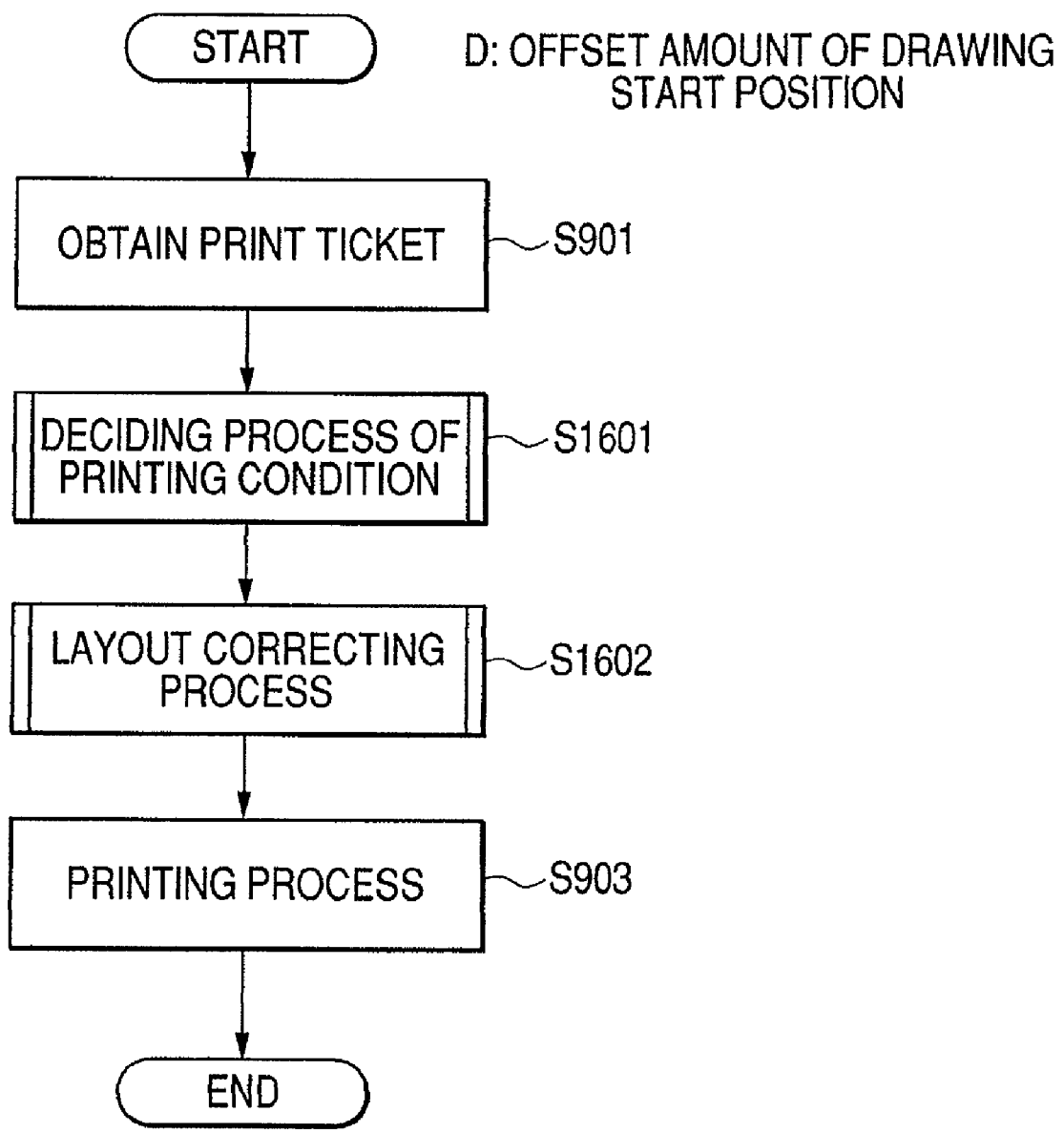
FIG. 17 is a flow chart showing an example of the data processing procedure (part 2).

FIG. 17 is a flow chart showing an example of the data processing procedure (part 2). S901, S903, S1601, and S1602 indicate processing steps. Each step is realized by a method whereby the CPU of the host computer 201 loads a control program from the external storing apparatus or the like into the memory and executes the control program.

In the diagram, processes similar to those in FIG. 9 shown in the first embodiment are designated by the same step numbers and their overlapped description is omitted here.

Figure 18:
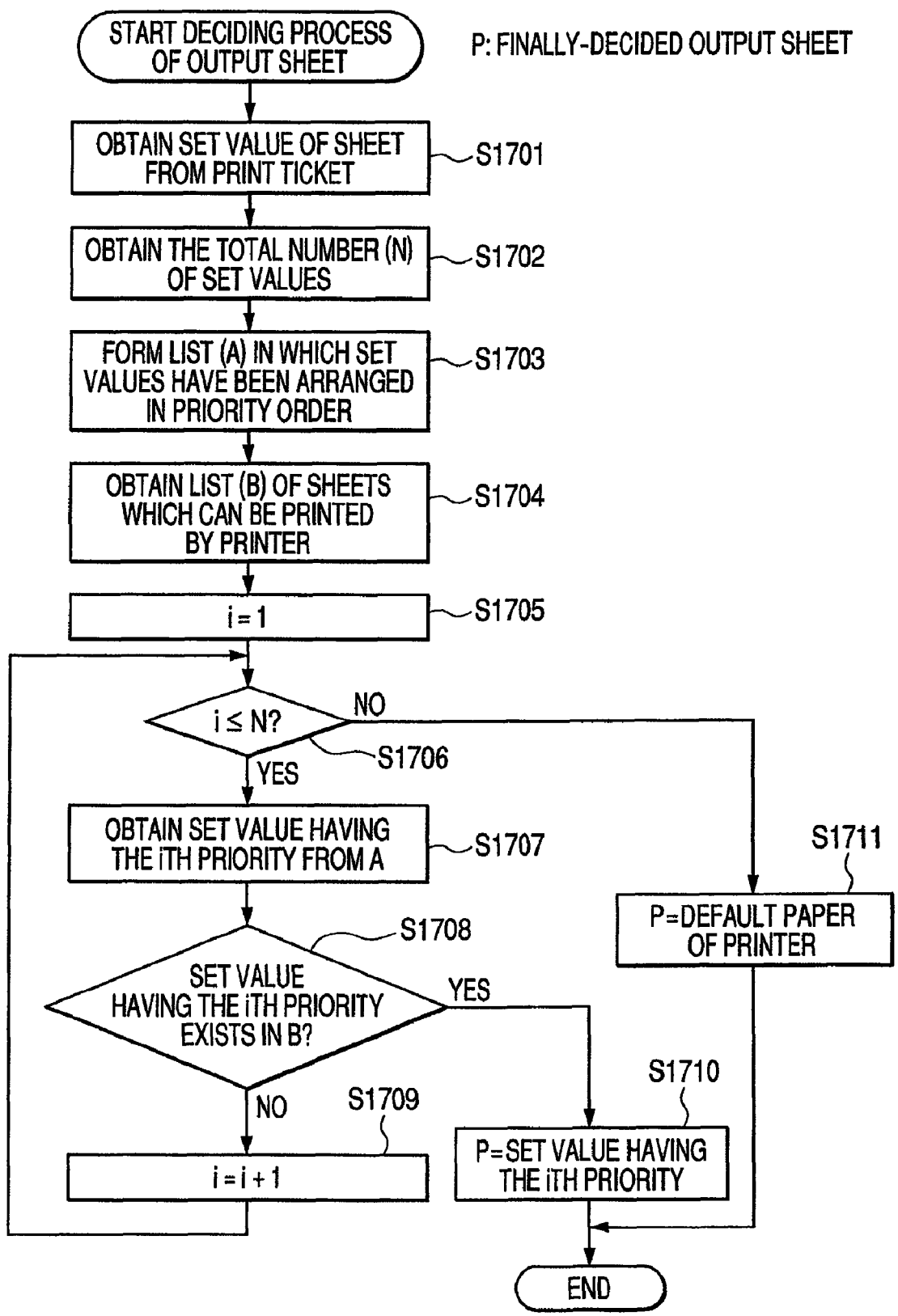
FIG. 18 is a flow chart showing details of the printing condition deciding process of step S1601 shown in FIG. 17.
Figure 19:
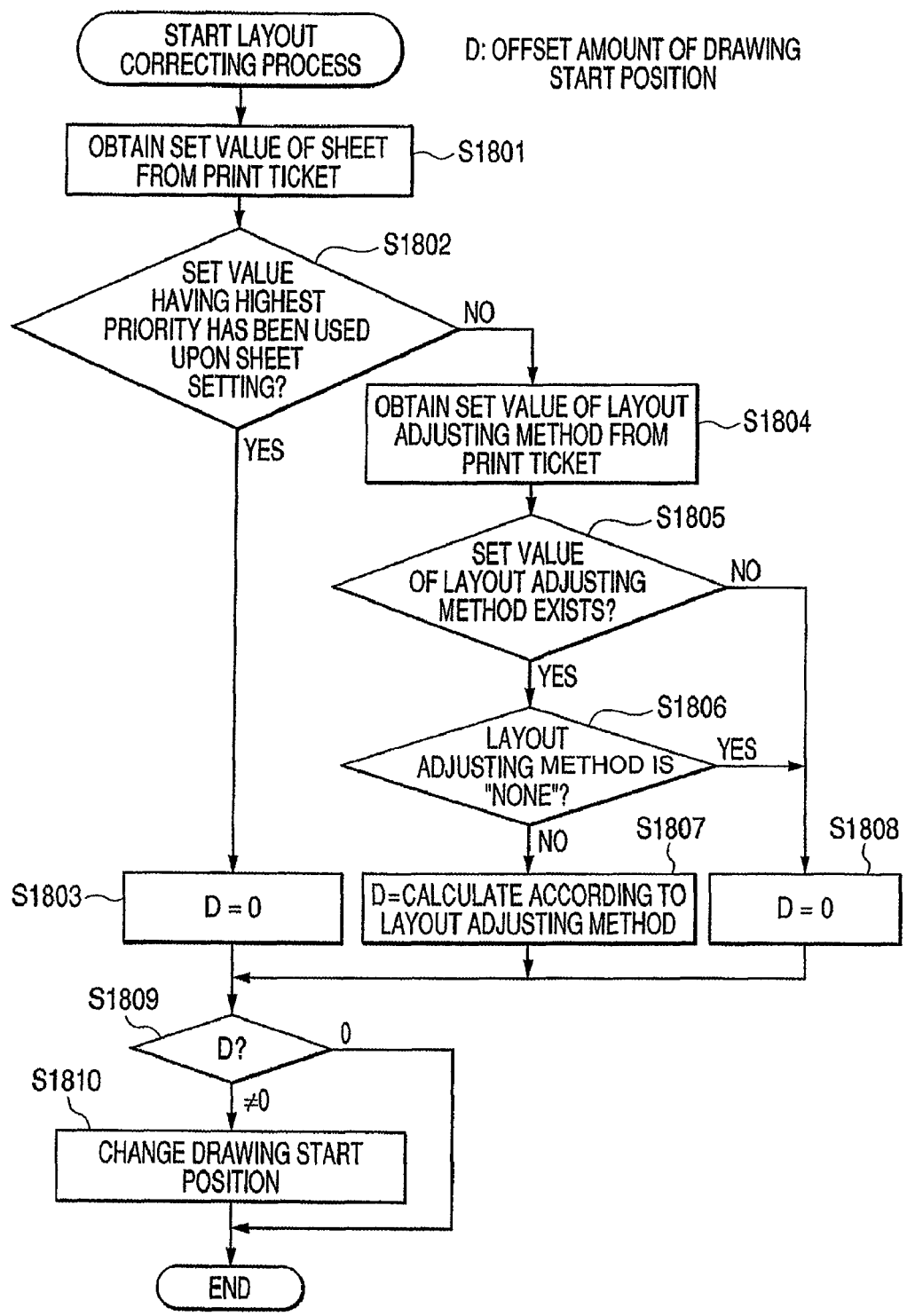
FIG. 19 is a flow chart showing details of the layout correcting process of step S1602 shown in FIG. 17.

In step S1601, by the printing condition deciding process, the UID 403 decides the printing conditions in which the print data can be printed and output by the printer 202. Details of the process of S1601 are shown in FIG. 18, which will be described hereinafter. In step S1602, the PPF 407 adjusts the drawing start position of the print data by the layout correcting process. Details of the process of S1602 are shown in FIG. 19, which will be described hereinafter.

FIG. 18 is a flow chart showing details of the printing condition deciding process of step S1601 shown in FIG. 17. This process relates to an example of the process which is executed by paying an attention to, particularly, the output sheet in the printing condition deciding process which is executed by the UID 403 as an operation of the print system 200.

S1701 to S1711 indicate processing steps. Each step is realized by a method whereby the CPU of the host computer 201 loads a control program from the external storing apparatus or the like into the memory and executes the control program.

First, in step S1701, the UID 403 obtains the set values of the output sheet from the print ticket which has previously been derived in step S901.

Subsequently, in step S1702, the UID 403 obtains the total number (N) of set values of the output sheets obtained in step S1701.

In next S1703, the UID 403 forms an output sheet condition set value list (A) in which the set values of the number as many as the total number (N) of set values of the output sheets obtained in step S1702 can be stored. The UID 403 stores the set values of the output sheets obtained in step S1701 in order from the higher priority.

Subsequently, in step S1704, the UID 403 refers to the support output sheet list information table 1500 illustrated in FIG. 16 and obtains a list (B) of output sheets, as an example of the set value resource information, in which the print data can be printed and output by the printer 202.

In steps S1706 to S1709, a searching process of the output sheet to be finally decided is executed by repeating the process the number of times as many as the total number (N) of set values of the output sheets obtained in step S1702. Therefore, in step S1705, the UID 403 initializes the count value of the processing counter to "1".

Subsequently, in step S1706, the UID 403 discriminates whether or not the count value of the processing counter is equal to or less than the total number (N) of set values of the output sheets obtained in step S1702. As a result of the discrimination, if the UID 403 determines that the count value of the processing counter is equal to or less than the total number (N) of set values of the output sheets obtained in step S1702 (that is, YES in step S1706), the processing routine advances to step S1707. If the UID 403 determines that the count value is larger than the total number (N) (that is, NO in step S1706), the processing routine advances to step S1711.

In step S1707, the UID 403 refers to the output sheet condition set value list (A) formed in step S1703 and obtains the set value of the output sheet having the same priority as that of the count value of the processing counter.

Subsequently, in step S1708, the UID 403 discriminates whether or not the set value of the output sheet obtained in step S1707 is included in the list (B) (obtained in step S1704) of the output sheets which can be printed and output by the printer 202.

As a result of the discrimination, if the UID 403 determines that the set value of the output sheet obtained in step S1707 is included in the list (B) of the output sheets which can be printed and output by the printer 202, step S1710 follows. If the UID 403 determines that the set value is not included, step S1709 follows.

In step S1709, the UID 403 increases the count value of the processing counter by one. The processing routine is returned to step S1706.

In step S1710, the UID 403 decides the output sheet obtained in step S1707 as a final printing condition and updates the print ticket. The processing routine is finished.

In step S1711, the UID 403 refers to the support output sheet list information table 1500 illustrated in FIG. 16 and obtains the predetermined regular output sheet from the list of the output sheets which can be printed and output by the printer 202. The UID 403 decides the regular output sheet as a final printing condition and updates the print ticket. The processing routine is finished.

FIG. 19 is a flow chart showing details of the layout correcting process of step S1602 shown in FIG. 17.

S1801 to S1810 indicate processing steps. Each step is realized by a method whereby the CPU of the host computer 201 loads a control program from the external storing apparatus or the like into the memory and executes the control program.

First, in step S1801, the PPF 407 obtains the set values of the output sheet and the priorities associated with the set values of the output sheet from the print ticket obtained after the printing condition deciding process by the UID 403.

Subsequently, in step S1802, the PPF 407 refers to the priorities obtained in step S1801, thereby discriminating whether or not the output sheet decided by the printing condition deciding process in the UID 403 has the set value of the highest priority (priority discriminating unit).

As a result of the discrimination, if the PPF 407 determines that the output sheet decided by the printing condition deciding process has the set value of the highest priority, step S1803 follows. If the PPF 407 determines that the output sheet does not have the set value of the highest priority, step S1804 follows.

In step S1803, the PPF 407 determines that in the case of using the output sheet decided by the printing condition deciding process, a problem of the layout is not caused when the document such as a photo image or the like is printed and output (in other words, there is no need to adjust the layout of the document). The PPF 407 decides an offset amount for adjusting the drawing start position to "0".

In step S1804, the PPF 407 obtains the layout adjusting method associated with the set values of the output sheet from the print ticket obtained after the printing condition deciding process by the UID 403.

In next step S1805, the PPF 407 discriminates whether or not the layout adjusting method associated with the set values of the output sheet could be obtained in step S1804 (correction discriminating unit). As a result of the discrimination, if the PPF 407 determines that the layout adjusting method could be obtained, step S1806 follows. If the PPF 407 determines that the layout adjusting method cannot be obtained, step S1808 follows.

In step S1806, the PPF 407 discriminates whether or not the layout adjusting method obtained in step S1804 is "None" (correction discriminating unit).

As a result of the discrimination, if the PPF 407 decides that the layout adjusting method obtained in step S1804 is "None", step S1808 follows. If the PPF 407 decides that the layout adjusting method is other than "None", step S1807 follows.

In next step S1807, the PPF 407 calculates the offset amount for adjusting the drawing start position based on the layout adjusting method obtained in step S1804.

In step S1808, the PPF 407 decides the offset amount for adjusting the drawing start position to "0".

Subsequently, in step S1809, the PPF 407 discriminates whether or not the offset amount for adjusting the drawing start position decided in step S1803, S1807, or S1808 is equal to "0".

As a result of the discrimination, if the PPF 407 decides that the offset amount for adjusting the drawing start position is equal to "0", the processing routine is finished. If the PPF 407 decides that the offset amount is other than "0", the processing routine advances to step S1810.

In step S1810, the PPF 407 updates the draw command included in the print data based on the offset amount for adjusting the drawing start position decided in step S1807, and the processing routine is finished.

<Example of Print Results by Layout Correcting Process>

Figures 20, 21:
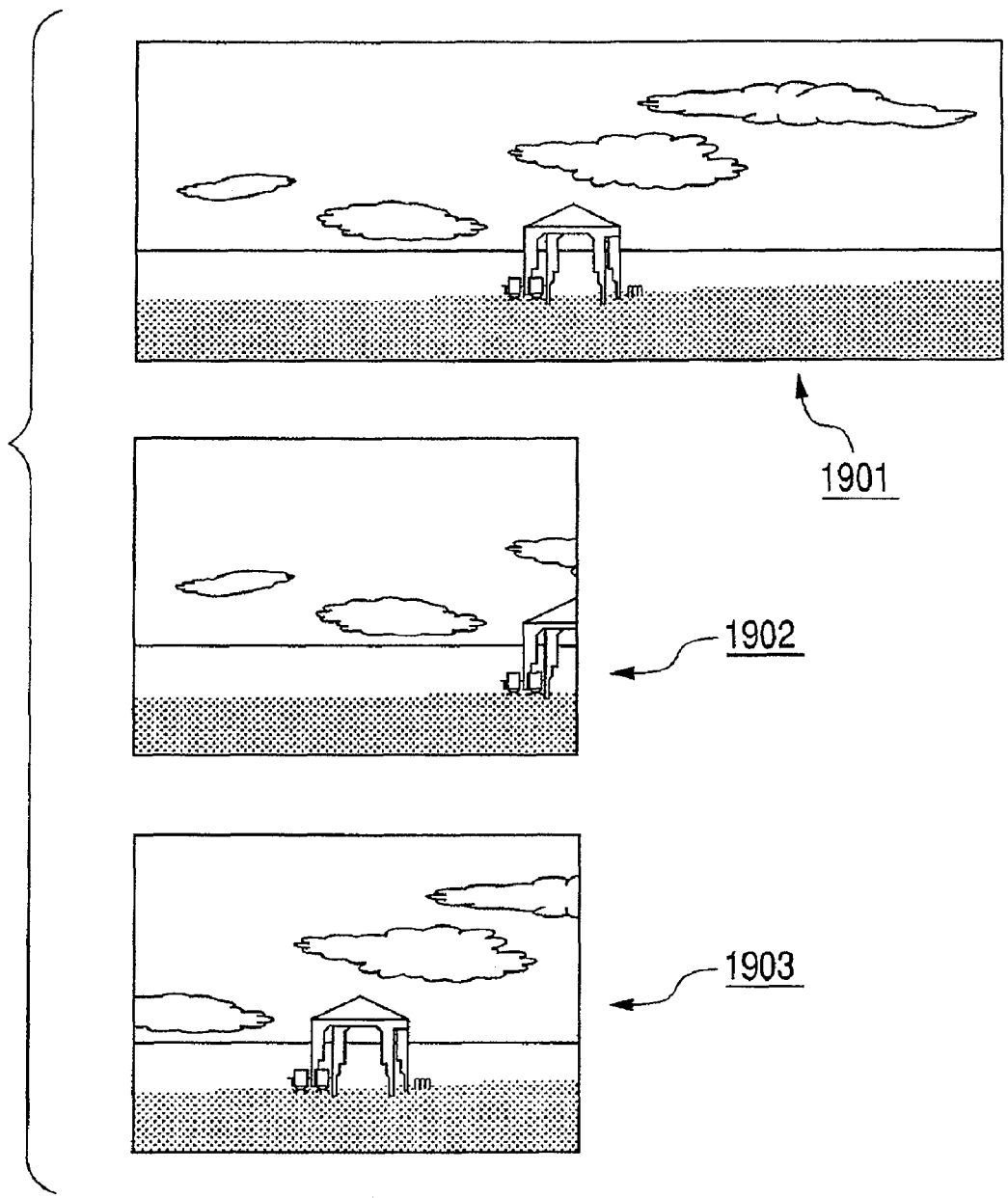
FIG. 20 is a diagram illustrating an example of print results in the case where the PPF 407 executes the layout correcting process when the printing apparatus 202 executes the print output to a photo image for "Panorama" and the XPS document in which the print ticket 1300 illustrated in FIG. 13 has been set.
FIG. 21 is a diagram showing an example of calculating equations of a calculating process of an offset amount for a drawing start position adjustment in the case where the PPF 407 executes the layout correcting process by applying "Centering" which has been set as a layout adjusting method in the print ticket.

FIG. 20 is a diagram illustrating an example of print results in the case where the PPF 407 executes the layout correcting process when the printer 202 executes the print output to a photo image for "Panorama" and the XPS document in which the print ticket 1300 illustrated in FIG. 13 has been set.

In FIG. 20, a print result 1901 is an example of a print result which is obtained in the case where "Panorama" has been applied as an output sheet by the printing condition deciding process by the UID 403.

In FIG. 20, each of print results 1902 and 1903 is an example of a print result which is obtained by the printing condition deciding process by the UID 403 in the case where "LPhoto" has been applied as an output sheet.

The print result 1902 is an example in the case where "None" has been set as a layout adjusting method associated with "LPhoto" in the print ticket or the layout adjusting method associated with "LPhoto" does not exist.

The print result 1903 is an example in the case where "Centering" has been set as a layout adjusting method associated with "LPhoto" in the print ticket.

<Example of Calculating Equations in Offset Amount Calculating Process for Adjusting Drawing Start Position>

FIG. 21 is a diagram showing an example of calculating equations of a calculating process of the offset amount for adjusting the drawing start position in the case where the PPF 407 executes the layout correcting process by applying "Centering" which has been set as a layout adjusting method in the print ticket.

In FIG. 21, W1 denotes a width of output sheet; H1 a height of output sheet; W2 a width of photo image; H2 a height of photo image; X an offset amount of an X coordinate; and Y an offset amount of a Y coordinate.

As mentioned above, according to the embodiment, the layout adjusting method which is executed in the case where it has been applied as a final printing condition by the first embodiment can be previously set for each of a plurality of set values with the priorities which have been set into the XPS document.

Further, the layout of the document can be decided based on the document such as a photo image or the like, the set value applied as a final printing condition by the first embodiment, and the layout adjusting method which has been set for the set value.

It is sufficient that the provider who provides the document such as a photo image or the like to an unspecified large number of users compares a size of the provided document such as a photo image or the like with that of each of the output sheets set in the XPS document and sets the layout adjusting method so that the style as a "photograph" is obtained in appearance. It is also sufficient that the provider sets the layout adjusting method so that the object in the photo image (portion which is particularly important as a "photograph") is correctly arranged on the output sheet.

Thus, the user who has received the provided XPS document can obtain a desired print result merely by executing the print output from the arbitrary printer without particularly being aware of the setting of the output sheet and the sizes, layouts, and the like of the output sheet and the document such as a photo image or the like.

It is also possible to construct in such a manner that in the photo image, at least the area which the user wants to arrange onto the output sheet can be set as a layout adjusting method. In such a case, even if any one of the output sheets is applied by the first embodiment, the layout is adjusted so that the whole set area is arranged onto the output sheet.

(Third Embodiment)

The second embodiment has been described with respect to the example in which the layout adjusting method which is used in the case where it has been applied as a final printing condition by the first embodiment is preliminarily set for each of a plurality of set values with the priorities which have been set into the XPS document. Further, there has been described the example in which when the XPS document is printed and output, irrespective of the output sheet decided as a final printing condition, the object in the photo image (portion which is particularly important as a "photograph") is correctly arranged on the output sheet according to the preset layout adjusting method. Thus, the user who has received the provided XPS document can obtain a desired print result merely by executing the print output from the arbitrary printer without particularly being aware of the setting of the output sheet and the sizes, layouts, and the like of the output sheet and the document such as a photo image or the like.

By using the foregoing embodiment, the print output is executed in such a manner that the style as a "photograph" is certainly obtained in appearance and the object in the photo image (portion which is particularly important as a "photograph") is correctly arranged on the output sheet.

However, the layout adjustment which has been made according to the layout adjusting method set by the provider of the document such as a photo image or the like does not necessarily provide the best result for the user. For example, even if the same photo image is printed and output from the same outputting apparatus under the same printing conditions, there is a possibility that favorites and hopes of the users to the layout of the "photograph" which is obtained as a print result differ more or less every user. There is also a case where the target of the object in the photo image (portion which is particularly important as a "photograph") of the provider of the document such as a photo image or the like and that of the user who has received the provided document are different.

It is desirable that the user's desired print result is obtained by the layout adjustment made according to the layout adjusting method set by the provider of the document such as a photo image or the like. However, if the user's desired print result is not obtained according to the layout adjusting method, it is finally determined by the user that the unexpected print result is obtained. In other words, the photo paper and ink are wastefully consumed.

Therefore, in the embodiment, an example in which after the layout adjustment was made according to the layout adjusting method set by the provider of the document such as a photo image or the like, when the print output is actually executed, a preview of the print result is previously displayed will be described. By using such a method, the user can confirm whether or not the desired print result can be obtained.

In the embodiment, an example in which if it is determined from the displayed preview that the desired print result cannot be obtained, the user himself makes the layout adjustment during the previewing will be further described.

Figure 25:
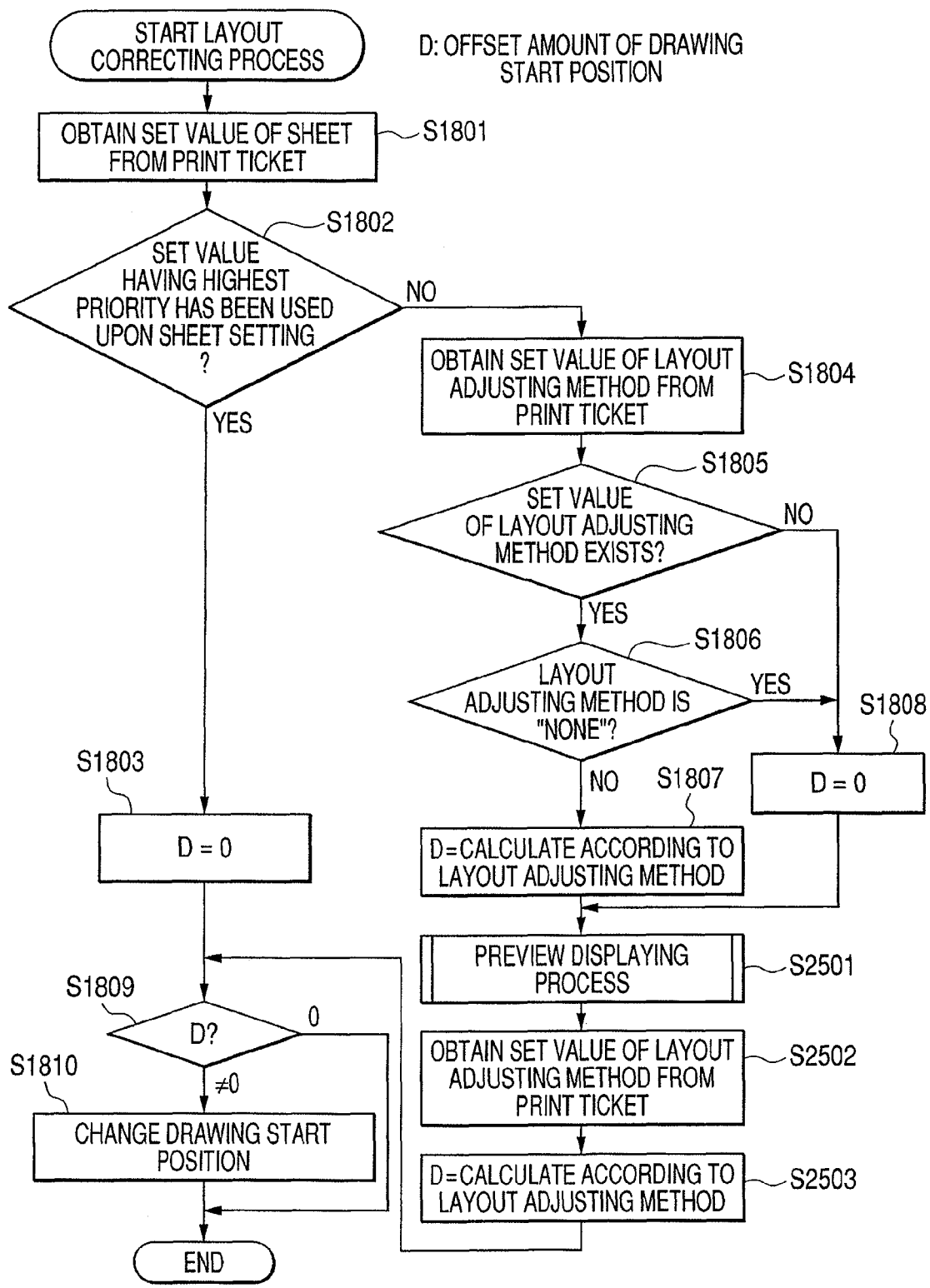
FIG. 25 is a flow chart showing details of the layout correcting process of step S1602 shown in FIG. 17.

Description of the portions common to those in the second embodiment, for example, in FIGS. 1, 2, and the like is omitted here. However, the processes of FIGS. 4 and 19 are unique to the second embodiment, processes of FIG. 22 are executed in the embodiment in place of FIG. 4, and processes of FIG. 25 are executed in the embodiment in place of FIG. 19.

<Functional Construction of Print System 200>

Figure 22:
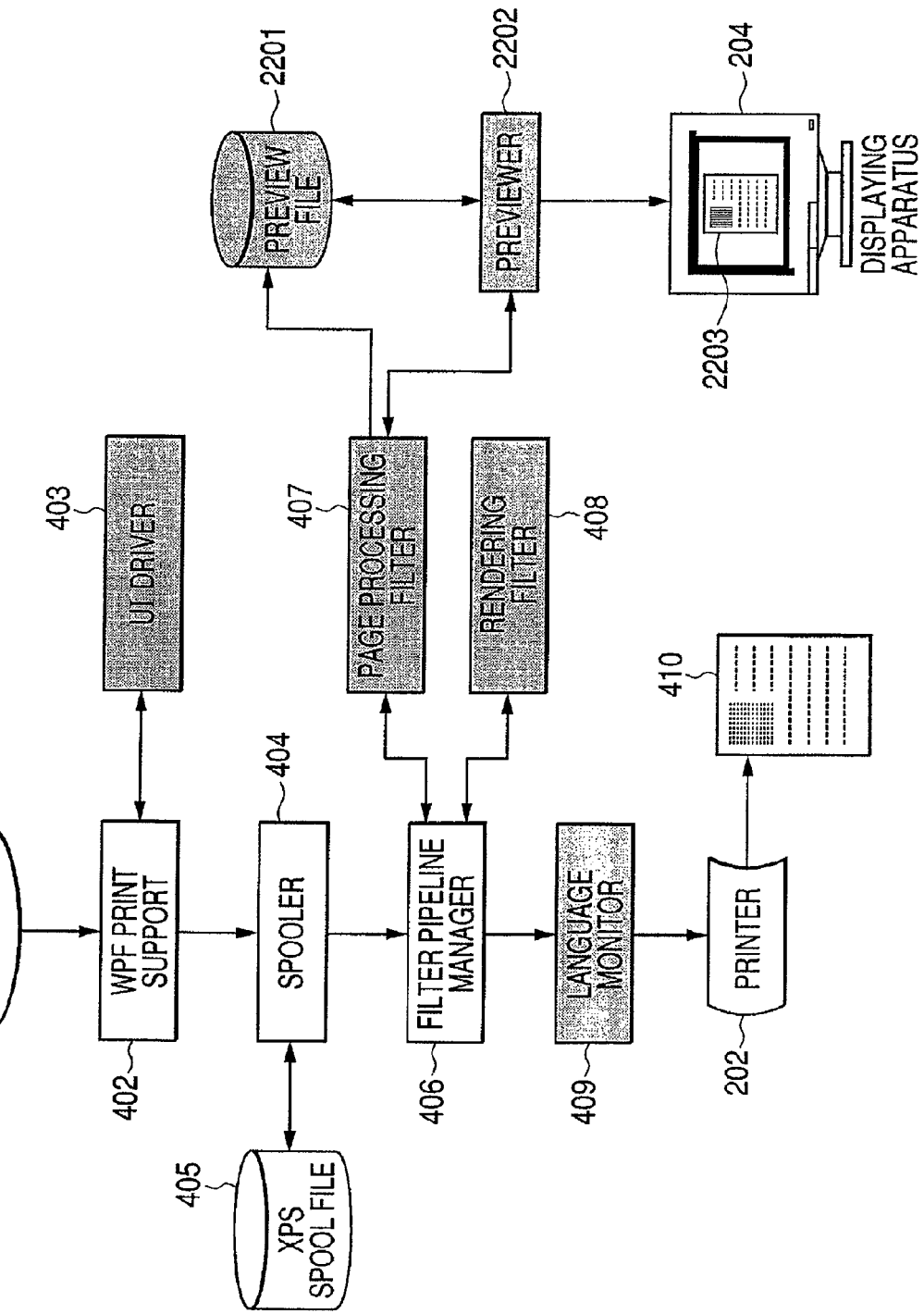
FIG. 22 is a diagram illustrating an example of a print control function by the host computer 201.

FIG. 22 is a diagram illustrating an example of the print control function by the host computer 201.

In FIG. 22, the print control function by the host computer 201 includes eleven print function processing units.

In the diagram, the print function processing units similar to those in FIG. 4 shown in the first embodiment are designated by the same reference numerals and their detailed description is omitted here.

The print control function of the embodiment further includes a preview file (PVF) 2201 and a previewer (PV) 2202 in addition to the print control function illustrated in FIG. 4.

First, main functions of each of the print function processing units included in the print control function of the embodiment will be described.

The PPF 407 converts the print data in the XPS document into bitmap data which can be preview-displayed (hereinafter, such bitmap data is called "print preview data"). The PPF 407 stores the function adapted to store the converted bitmap data into the PVF 2201 and the print ticket in the XPS document into the PVF 2201.

Further, the PPF 407 activates the PV 2202.

When the preview is displayed by the displaying apparatus 204, the PVF 2201 is a file which is temporarily formed and includes the print preview data and the print ticket.

The PV 2202 obtains the print preview data (bitmap data) stored in the PVF 2201 and displays a preview result 2203 by the displaying apparatus 204 (display unit). The PV 2202 changes the layout adjusting method set in the print ticket (change unit).

The operation of the print control function in the embodiment will now be described.

Only the layout correcting process which differs from FIG. 4 illustrated in the first and second embodiments will be described here.

More specifically speaking, when the notification of the XPS document is received from the FPM 406, the PPF 407 executes the layout correcting process, which will be described hereinafter, prior to the edition of the print data and the edition of the page construction of the XPS document.

<Layout Correcting Process>

First, the PPF 407 obtains the print data and the print ticket from the XPS document notified from the FPM 406.

Subsequently, the PPF 407 obtains the settings of the output sheet described in the print ticket. Subsequently, the PPF 407 obtains the priorities associated with the set values of the output sheet and the layout adjusting method.

Further, the PPF 407 calculates the drawing start position of the print data based on the settings of the output sheet, the priorities, and the layout adjusting method which have been obtained.

Subsequently, the PPF 407 edits the print data based on the calculated drawing start position. More specifically speaking, the PPF 407 changes the draw command included in the print data based on the calculated drawing start position.

Subsequently, the PPF 407 executes the minimum necessary image process and the like to the print data and forms bitmap data (print preview data) for displaying the preview.

Then, the PPF 407 stores the formed print preview data and the print ticket into the PVF 2201 and activates the PV 2202.

When the PV 2202 is activated by the PPF 407, the PV 2202 inquires the file name of the PVF 2201 from the PPF 407.

When the inquiry about the file name of the PVF 2201 is received from the PV 2202, the PPF 407 notifies the PV 2202 of the file name.

When the notification of the file name of the PVF 2201 is received from the PPF 407, the PV 2202 obtains the print preview data and the print ticket stored in the PVF 2201.

Subsequently, the PV 2202 displays a preview result onto the displaying apparatus 204 based on the obtained print preview data and the output sheet set in the print ticket.

Subsequently, the PV 2202 initializes a control (combo box) for changing the layout adjusting method based on the layout adjusting method included in the obtained print ticket and accepts the change in the layout adjusting method from the user.

Each time the change in the layout adjusting method is received from the user, the PV 2202 changes the layout adjusting method in the print ticket and notifies the PPF 407 of the print ticket.

Each time the print ticket in which the layout adjusting method has been changed is received from the PV 2202, the PPF 407 calculates the drawing start position of the print data based on the changed layout adjusting method. Further, the PPF 407 repeats a series of processes such as edition of the print data, creation of the print preview data, storage of the formed print preview data and the print ticket into the PVF 2201, and the like based on the calculated drawing start position.

Each time the print preview data stored in the PVF 2201 is updated, the PV 2202 displays the new preview result onto the displaying apparatus 204.

When the display by the PV 2202 is finished, the PPF 407 restarts the subsequent printing process.

<Example of Preview Display>

Figure 23:
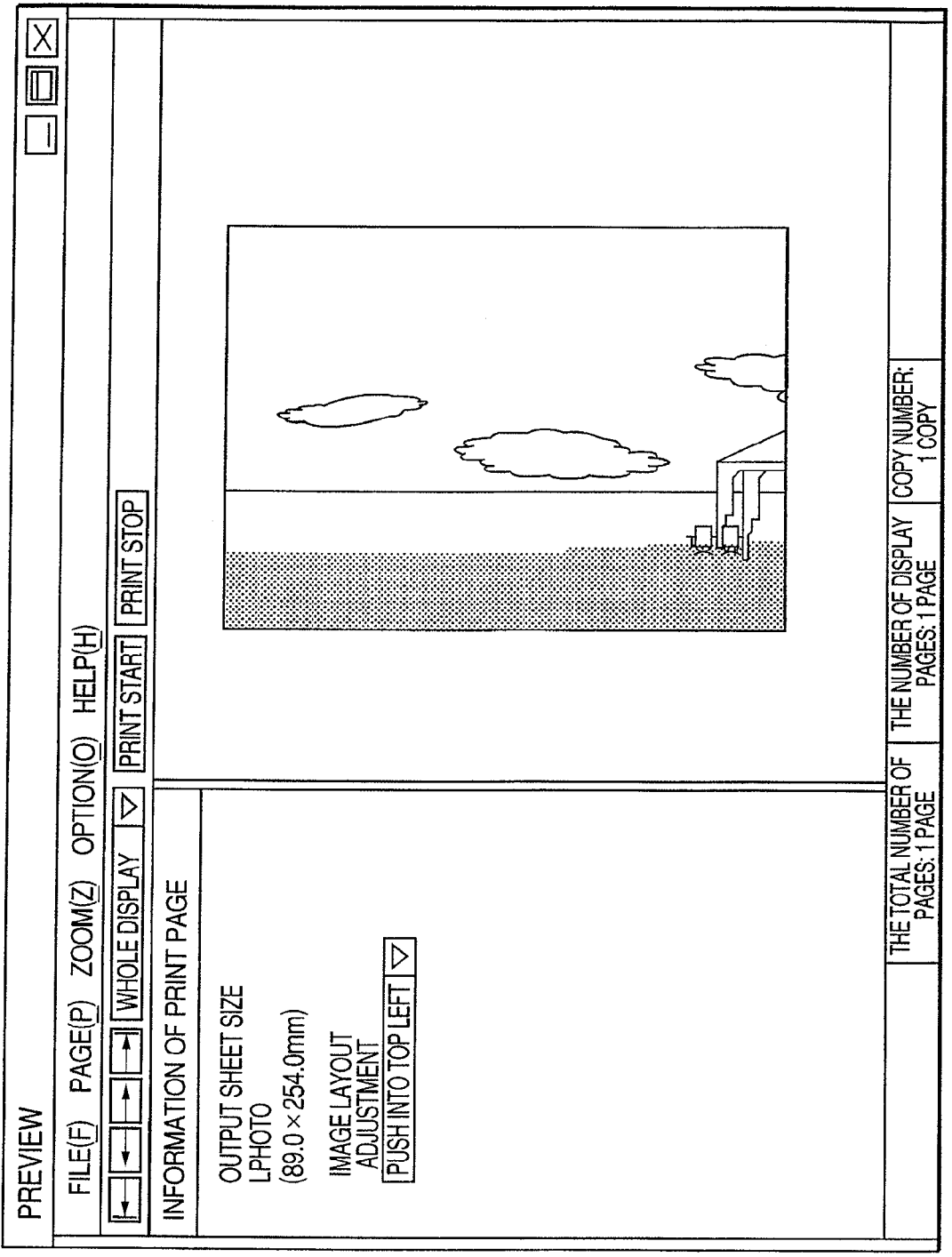
FIG. 23 is a diagram illustrating an example of a preview display screen 2300 which is displayed by a PV 2202 in the case where "LPhoto" is applied as an output sheet by the printing condition deciding process by the UID 403.
Figure 24:
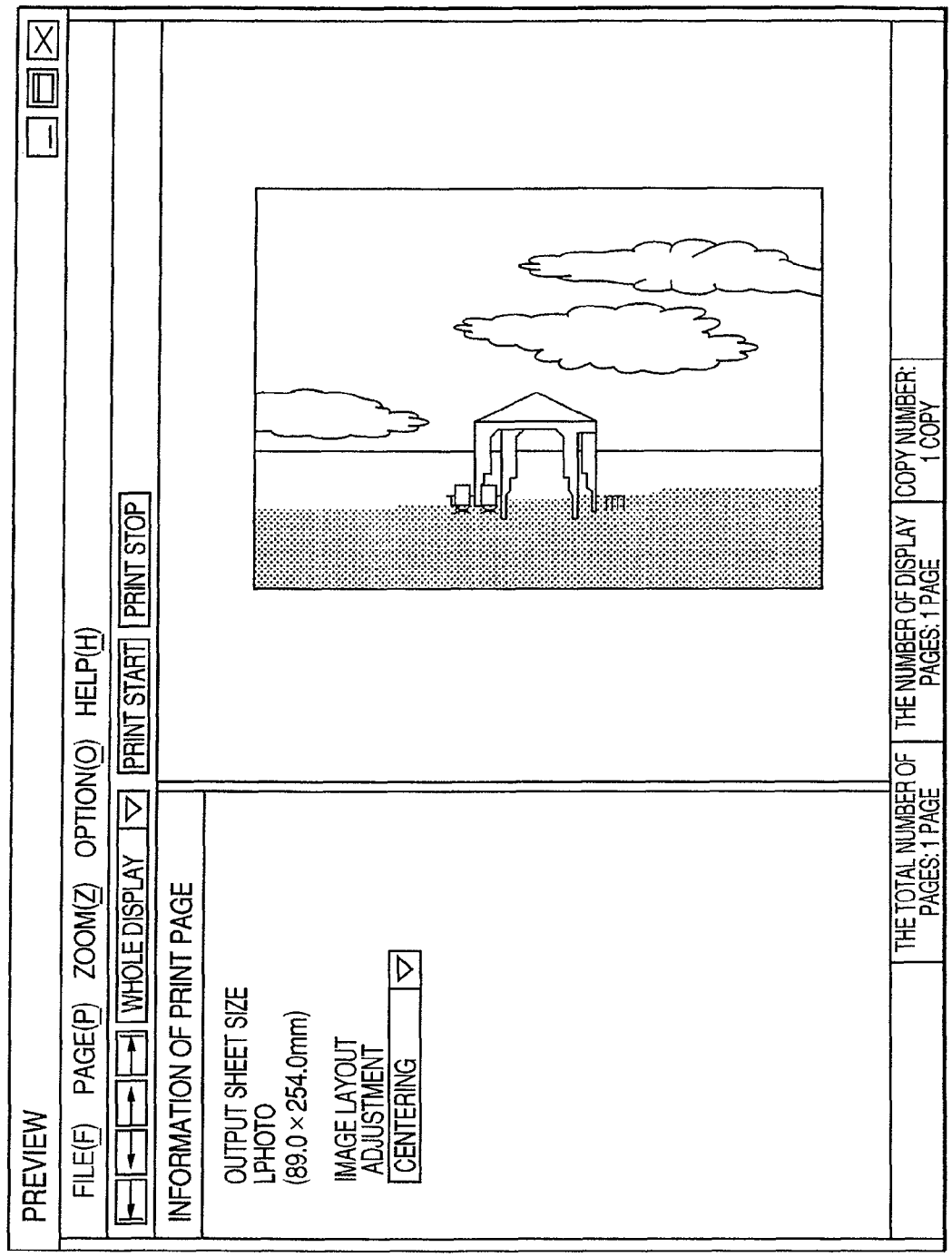
FIG. 24 is a diagram illustrating an example of a preview display screen 2400 which is displayed by a PV 2202 in the case where "LPhoto" is applied as an output sheet by the printing condition deciding process by the UID 403.

FIGS. 23 and 24 are diagrams illustrating examples of preview display screens 2300 and 2400 which are displayed by the PV 2202 in the case where "LPhoto" is applied as an output sheet by the printing condition deciding process by the UID 403.

In FIG. 23, the preview display screen 2300 relates to an example of a preview which is displayed in the case where "TopLeft" has been set as a layout adjusting method associated with "LPhoto" in the print ticket.

In FIG. 24, the preview display screen 2400 relates to an example of a preview which is displayed in the case where the layout adjusting method has been changed to "Centering" in the state where the preview display screen 2300 has been displayed in FIG. 23.

<Operation of Print System 200>

FIG. 25 is a flow chart showing details of the layout correcting process of step S1602 shown in FIG. 17.

S1801 to S1810 and S2501 to S2503 indicate processing steps. Each step is realized by a method whereby the CPU of the host computer 201 loads a control program from the external storing apparatus or the like into the memory and executes the control program.

In the diagram, processes similar to those in FIG. 19 shown in the second embodiment are designated by the same step numbers and their overlapped description is omitted here.

In step S2501, the PPF 407 displays the preview of the print result by a preview displaying process. Details of the process of S2501 are shown in FIG. 26, which will be described hereinafter.

Subsequently, in step S2502, the PPF 407 obtains the layout adjusting method associated with the set values of the output sheet from the print ticket notified from the PV 2202.

In next step S2503, the PPF 407 calculates the offset amount for adjustment of the drawing start position based on the layout adjusting method obtained in step S2502.

Figure 26:
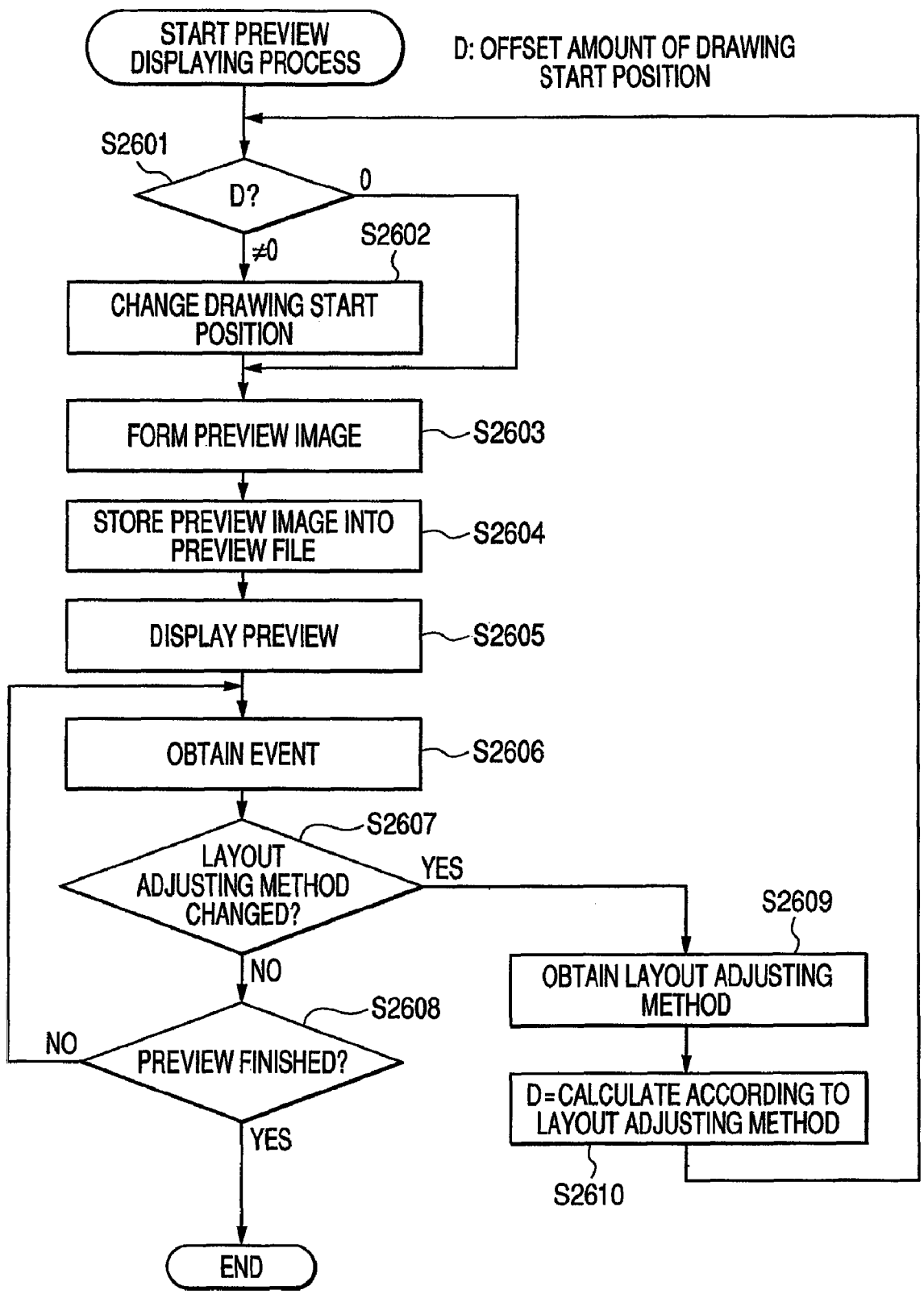
FIG. 26 is a flow chart showing details of a preview displaying process of step S2501 shown in FIG. 25.

FIG. 26 is a flow chart showing the details of the preview displaying process of step S2501 shown in FIG. 25.

S2601 to S2610 indicate processing steps. Each step is realized by a method whereby the CPU of the host computer 201 loads a control program from the external storing apparatus or the like into the memory and executes the control program.

First, in step S2601, the PPF 407 discriminates whether or not the offset amount for the drawing start position adjustment decided in step S1807 or S1808 is equal to 0.

As a result of the discrimination, if the PPF 407 determines that the offset amount for the drawing start position adjustment is equal to 0, step S2603 follows. If the PPF 407 determines that the offset amount is not equal to 0, step S2602 follows.

In step S2602, the PPF 407 updates the draw command included in the print data based on the offset amount for the drawing start position adjustment decided in step S1807 or S1808.

In next step S2603, the PPF 407 forms the bitmap data (print preview data) for displaying the preview.

Subsequently, in step S2604, the PPF 407 stores the print preview data formed in step S2603 into the PVF 2201.

Subsequently, in step S2605, the PV 2202 extracts the print preview data stored in the PVF 2201 and displays the preview result 2203 onto the displaying apparatus 204.

In next step S2606, the PV 2202 obtains an event in response to an operating instruction from the user on the preview display screen 2300.

Subsequently, in step S2607, by the event obtained in step S2606, the PV 2202 discriminates whether or not the layout adjusting method has been changed.

As a result of the discrimination, if the PV 2202 decides that the layout adjusting method has been changed, step S2609 follows. If the PV 2202 decides that the layout adjusting method is not changed, step S2608 follows.

In step S2608, by the event obtained in step S2606, the PV 2202 discriminates whether or not the preview display is finished.

As a result of the discrimination, if the PV 2202 decides that the preview display is finished, the processing routine is finished. If the PV 2202 decides that the preview display is not finished, the processing routine is returned to step S2606.

In next step S2609, the PV 2202 obtains the layout adjusting method changed on the preview display screen 2300 and notifies the PPF 407 of the changed layout adjusting method.

Subsequently, in step S2610, the PPF 407 calculates the offset amount for the drawing start position adjustment based on the layout adjusting method obtained in step S2609. The processing routine is returned to step S2601.

As mentioned above, according to the embodiment, after the layout adjustment was made according to the layout adjusting method set by the provider of the document such as a photo image or the like, when the print output is actually performed, the preview of the print result is preliminarily displayed. Thus, the user can confirm whether or not the desired print result is obtained.

Further, if the user decides from the displayed preview that the desired print result is not obtained, the user himself can make the layout adjustment during the preview.

(Fourth Embodiment)

A construction of data processing programs which can be read out by the host computer 201 will be described hereinbelow with reference to a memory map illustrated in FIG. 27.

FIG. 27 is a diagram for describing the memory map in a storing medium in which various data processing programs that can be read out by the host computer 201 are stored.

Although not particularly illustrated, there is also a case where information for managing the group of programs which are stored in the storing medium, for example, version information, an implementor's name, and the like are also stored, and information depending on the OS or the like on the program reading side, for example, icons for identifying and indicating the programs, and the like are also stored.

Further, data belonging to the various programs is also managed in the directory. There is also a case where a program for installing the various programs into the computer and, if the installing program has been compressed, a program for decompressing the compressed program, and the like are also stored.

The functions shown in FIGS. 9, 10, 17 to 19, 25, and 26 in the embodiments may be executed by the host computer by programs which are installed from the outside. In such a case, the invention is also applied to the case where an information group including the programs is supplied to an outputting apparatus by a storing medium such as CD-ROM, flash memory, FD, or the like or from an external storing medium through a network.

The objects of the invention are also accomplished by a method whereby the storing medium in which program codes of software for realizing the functions of the embodiments mentioned above have been recorded is supplied to a system or an apparatus and a computer (or a CPU or an MPU) of the system or the apparatus reads out and executes the program codes stored in the storing medium.

In this case, the program codes themselves read out of the storing medium realize the novel functions of the invention and the storing medium in which the program codes have been stored constructs the invention.

Therefore, the form of the program is not limited but any one of an object code, a program which is executed by an interpreter, script data which is supplied to the OS, and the like can be used so long as they have the function of the program.

As a storing medium for supplying the program, for example, a flexible disk, a hard disk, an optical disc, a magnetooptic disc, an MO, a CD-ROM, a CD-R, a CD-RW, a magnetic tape, a non-volatile memory card, a ROM, a DVD, or the like can be used.

In such a case, the program codes themselves read out of the storing medium realize the functions of the embodiments mentioned above and the storing medium in which the program codes have been stored constructs the invention.

As another program supplying method, the program can be also supplied by a method whereby a client computer is connected to Home page of the Internet by using a browser of the client computer, and the computer program itself of the invention or a compressed file including an automatic installing function is downloaded to the storing medium such as a hard disk or the like. The program supplying method can be also realized by a method whereby the program codes constructing the program of the invention are divided into a plurality of files and each file is downloaded from the different Home page. That is, a WWW server, an ftp server, or the like for allowing a program file for realizing the functional processes of the invention by the computer to be downloaded to a plurality of users is also incorporated in the claims of the invention.

The program supplying method can be also realized by a method whereby the program of the invention is encrypted, stored into the storing medium such as a CD-ROM or the like, and distributed to the users, key information to decrypt the encryption is downloaded to the users who can satisfy a predetermined condition from the Home page through the Internet, and the encrypted program is executed by using the key information and installed into the computer.

The invention incorporates not only the case where the computer executes the read-out program codes, so that the functions of the embodiments mentioned above are realized but also the case where, for example, the OS or the like which is operating on the computer executes a part or all of the actual processes based on instructions of the program codes and the functions of the embodiments mentioned above are realized by those processes.

Further, the invention incorporates the case where the program codes read out of the storing medium are written into a memory provided for a function expanding board inserted in the computer or a function expanding unit connected to the computer, thereafter, a CPU or the like provided for the function expanding board or the function expanding unit executes a part or all of the actual processes based on the instructions of the program codes, and the functions of the embodiments mentioned above are realized by those processes.

Although the desirable embodiments of the invention have been described in detail above, the invention is not limited to such specific embodiments but many modifications and variations are possible within the scope of the spirit of the invention disclosed in the scope of claims for a Patent.

According to the embodiments of the invention, the proper print result can be provided according to the printing conditions set on a distributing source side of the print content.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-352760, filed Dec. 27, 2006, which is hereby incorporated by reference herein in its entirety.

What is claimed is:

1. An information processing apparatus for outputting a document to a printing apparatus, comprising:
    an obtaining unit constructed to obtain, from a print ticket that stores a plurality of setting values of a media type together with respective priority levels, one of the plurality of setting values with a highest priority level;
    a determining unit constructed to determine whether printing of the document is possible in the printing apparatus with the setting value with the highest priority level obtained by the obtaining unit; and
    a deciding unit constructed to decide the setting value with the highest priority level as a print condition, if the determining unit determines that the printing of the document is possible with the setting value with the highest priority level,
    wherein the deciding unit decides another of the plurality of setting values with a second highest priority level obtained by the obtaining unit as the print condition, if the determining unit determines that the printing of the document is not possible with the setting value with the highest priority level, but the determining unit determines that the printing of the document is possible with the setting value with the next highest priority level.

2. The information processing apparatus according to claim 1, wherein the determining unit makes a determination based on set value resource information.

3. An information processing apparatus for outputting a document to a printing apparatus, comprising:
    an obtaining unit constructed to obtain, from a print ticket that stores a plurality of setting values of a media type together with respective priority levels, one of the plurality of setting values with a highest priority level;
    a determining unit constructed to determine whether printing of the document is possible in the printing apparatus with the setting value with the highest priority level obtained by the obtaining unit;
    a deciding unit constructed to decide the setting value with the highest priority level as a print condition, if the determining unit determines that the printing of the document is possible with the setting value with the highest priority level; and
    a correcting unit constructed to make a correction on the document, if the determining unit determines that the printing of the document is not possible with the setting value with the highest priority level, but the determining unit determines that the printing of the document is possible with another of the plurality of setting values with a next highest priority level obtained by the obtaining unit.

4. The information processing apparatus according to claim 3, further comprising a displaying unit constructed to display a print preview of the document with the correction by the correcting unit before outputting the document.

5. The information processing apparatus according to claim 4, further comprising a changing unit constructed to change a method of the correction during the displaying of the print preview of the document by the displaying unit.

6. An information processing control method performed by an information processing apparatus for outputting a document to a printing apparatus, comprising:
    an obtaining step of obtaining, from a print ticket that stores a plurality of setting values of a media type together with respective priority levels, one of the plurality of setting values with a highest priority level;
    a determining step of determining whether printing of the document is possible in the printing apparatus with the setting value with the highest priority level obtained by the obtaining step; and a deciding step of deciding the setting value with the highest priority level as a print condition, if the determining step determines that the printing of the document is possible with the setting value with the highest priority level, wherein the deciding step decides another of the plurality of setting values with a second highest priority level obtained by the obtaining step as the print condition, if the determining step determines that the printing of the document is not possible with the setting value with the highest priority level, but determines that the printing of the document is possible with the setting value with the next highest priority level.

7. An information processing control method according to claim 6, wherein the determining step makes a determination based on set value resource information.

8. An information processing control method performed by an information processing apparatus for outputting a document to a printing apparatus, comprising:

an obtaining step of obtaining, from a print ticket that stores a plurality of setting values of a media type together with respective priority levels, one of the plurality of setting values with a highest priority level;

a determining step of determining whether printing of the document is possible in the printing apparatus with the setting value with the highest priority level obtained by the obtaining step;

a deciding step of deciding the setting value with the highest priority level as a print condition, if the determining step determines that the printing of the document is possible with the setting value with the highest priority level; and a correcting step of correcting on the document, if the determining step determines that the printing of the document is not possible with the setting value with the highest priority level, but determines that the printing of the document is possible with another of the plurality of setting values with a next highest priority level obtained by the obtaining step.

9. An information processing control method according to claim 8, further comprising a displaying step configured to display a print preview of the document with the correction by the correcting step before outputting the document.

10. An information processing control method according to claim 9, further comprising a changing step of changing a method of the correction during the displaying of the print preview of the document by the displaying step.

11. A non-transitory computer readable storage medium which stores thereon a computer executable control program to execute a control method for an information processing apparatus for outputting a document to a printing apparatus, comprising:

an obtaining step of obtaining, from a print ticket that stores a plurality of setting values of a media type together with respective priority levels, one of the plurality of setting values with a highest priority level;

a determining step of determining whether printing of the document is possible in the printing apparatus with the setting value with the highest priority level obtained by the obtaining step; and a deciding step of deciding the setting value with the highest priority level as a print condition, if the determining step determines that the printing of the document is possible with the setting value with the highest priority level, wherein the deciding step decides another of the plurality of setting values with a second highest priority level obtained by the obtaining step as the print condition, if the determining step determines that the printing of the document is not possible with the setting value with the highest priority level, but determines that the printing of the document is possible with the setting value with the next highest priority level.

12. A non-transitory computer readable storage medium according to claim 11, wherein the determining step makes a determination based on set value resource information.

13. A non-transitory computer readable storage medium which stores thereon a computer executable control program to execute a control method for an information processing apparatus for outputting a document to a printing apparatus, comprising:

an obtaining step of obtaining, from a print ticket that stores a plurality of setting values of a media type together with respective priority levels, one of the plurality of setting values with a highest priority level;

a determining step of determining whether printing of the document is possible in the printing apparatus with the setting value with the highest priority level obtained by the obtaining step;

a deciding step of deciding the setting value with the highest priority level as a print condition, if the determining step determines that the printing of the document is possible with the setting value with the highest priority level; and a correcting step of correcting on the document, if the determining step determines that the printing of the document is not possible with the setting value with the highest priority level, but determines that the printing of the document is possible with another of the plurality of setting values with a next highest priority level obtained by the obtaining step.

14. A non-transitory computer readable storage medium according to claim 13, further comprising a displaying step of displaying a print preview of the document with the correction by the correcting step before the outputting of the document.

15. A non-transitory computer readable storage medium according to claim 14, further comprising a changing step of changing a method of the correction during the displaying of the print preview of the document by the displaying step.

* * * * *